US006917924B1

(12) United States Patent
Ramsden et al.

(10) Patent No.: US 6,917,924 B1
(45) Date of Patent: *Jul. 12, 2005

(54) AUTOMATED PACKAGE SHIPPING MACHINE

(75) Inventors: Gary W. Ramsden, Eau Claire, WI (US); Kenneth Wayne Liles, San Antonio, TX (US)

(73) Assignee: USHIP Intellectual Properties, LLC, East Granby, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/551,766

(22) Filed: Apr. 18, 2000

Related U.S. Application Data

(63) Continuation of application No. 09/162,874, filed on Sep. 29, 1998, now Pat. No. 6,105,014, which is a continuation of application No. 08/845,012, filed on Apr. 27, 1997, now Pat. No. 5,831,220, which is a division of application No. 08/235,290, filed on Apr. 29, 1994, now Pat. No. 5,656,799, which is a continuation-in-part of application No. 07/903,342, filed on Jun. 24, 1992, now Pat. No. 5,340,948, which is a continuation-in-part of application No. 07/683,243, filed on Apr. 10, 1991, now Pat. No. 5,233,532.

(51) Int. Cl.[7] .............................................. G07B 17/60
(52) U.S. Cl. ...................... 705/407; 705/401; 705/408; 705/410
(58) Field of Search ............................... 705/400, 401, 705/406, 407, 408, 410

(56) References Cited

U.S. PATENT DOCUMENTS

| | | | |
|---|---|---|---|
| 2,688,878 A | 9/1954 | Kolisch | 73/432 |
| 2,689,082 A | 9/1954 | Kolisch | 235/61 |
| 2,708,368 A | 5/1955 | Kolisch | 73/432 |

(Continued)

FOREIGN PATENT DOCUMENTS

| | | | |
|---|---|---|---|
| DE | 19720053 A1 | * | 11/1998 |
| EP | 331352 | * | 9/1989 |
| EP | 356228 | * | 2/1990 |
| FR | 2619236 | | 8/1987 |
| WO | WO 90/01741 | | 2/1990 |
| WO | WO 90/01742 | | 2/1990 |

OTHER PUBLICATIONS

Barrett: "Ratemaking made easy. (The Shippers System computer software": Chilton's Distribution, Jun. 1991, v90, n6, p. 54.*
Babyak: "Low–cost, high–tech. (Pitney Bowes Inc.'s Paragom mail processor)(Motors, Fans & Blowers"; Appliance Manufacture Mar. 1994, vol. 42,No. 3, p. 36.*
Business Wire: "CON–WAY Will Enter Airfreight Forwarding Business: Will Link With Other CON–WAY Assets for Complete U.S Coverage"; Apr. 2, 2001, p. 2512.*

*Primary Examiner*—Edward R. Cosimano
(74) *Attorney, Agent, or Firm*—Katten Muchin Rosenman LLP; John S. Paniaguas

(57) ABSTRACT

A system for accepting and storing items for subsequent pickup by a commercial carrier includes a storage area which is defined by an outer housing, and a customer interface area that includes a weighing unit and a unit, such as a magnetic card reader, for accepting payment from a customer. The system may also include a control system that accepts address information from the customer through a key pad, and then instructs a printer to print an address label for the item. The system includes safeguards which prevent unauthorized access to the storage area, and will not provide a receipt to the customer until internal sensors verify deposit of the item. A manifest printer may also be provided for the benefit of the commercial carriers who service the system, to print out a summary of the transactions that pertain to each carrier. Alternatively, no storage area is provided. Instead, the item is given to a human attendant, such as a check out clerk of a grocery or hardware store and the like, with the appropriate mailing label for validation of receipt of the item by the attendant.

2 Claims, 27 Drawing Sheets

U.S. PATENT DOCUMENTS

| | | | |
|---|---|---|---|
| 2,812,904 A | 11/1957 | Kolisch | 235/61 |
| 3,290,491 A | 12/1966 | Wahlberg | 235/151.2 |
| 3,436,968 A | 4/1969 | Unger et al. | 73/433 |
| 3,866,235 A | 2/1975 | Maynard et al. | 346/22 |
| 3,877,531 A | 4/1975 | Storace et al. | 177/1 |
| 3,912,047 A | 10/1975 | Chun et al. | 186/1 R |
| 4,024,380 A | 5/1977 | Gunn | 235/61.9 |
| 4,268,817 A | 5/1981 | Simjian | 347/147 A |
| 4,319,328 A | 3/1982 | Eggert | 364/466 |
| 4,325,440 A | 4/1982 | Crowley et al. | 177/25 |
| 4,488,610 A | 12/1984 | Yankloski | 177/4 |
| 4,495,581 A | 1/1985 | Piccione | 705/402 |
| 4,511,793 A | 4/1985 | Racanelli | 235/375 |
| 4,597,707 A | 7/1986 | Cornacchia | 414/62 |
| 4,629,871 A | 12/1986 | Scribner et al. | 235/375 |
| 4,638,439 A | 1/1987 | Daniels | 364/446 |
| 4,773,029 A | 9/1988 | Claesson et al. | 364/562 |
| 4,800,505 A | 1/1989 | Axelrod et al. | 364/478 |
| 4,825,053 A | 4/1989 | Caille | 235/380 |
| 4,836,352 A | 6/1989 | Tateno et al. | 194/215 |
| 4,862,386 A | 8/1989 | Axelrod et al. | 364/518 |
| 4,868,757 A | 9/1989 | Gil | 364/464.03 |
| 4,900,905 A | 2/1990 | Pusic | 235/381 |
| 4,923,022 A | 5/1990 | Hsieh | 177/4 |
| 4,934,846 A * | 6/1990 | Gilham | 400/104 |
| 4,940,887 A | 7/1990 | Sheng-Jung | 235/381 |
| 5,005,124 A | 4/1991 | Connell et al. | 705/1 |
| 5,025,386 A | 6/1991 | Pusic | 364/478 |
| 5,042,015 A | 8/1991 | Stringer | 364/99 |
| 5,117,364 A * | 5/1992 | Barns-Slavin et al. | 705/402 |
| 5,191,533 A * | 3/1993 | Haug | 705/407 |
| 5,229,932 A | 7/1993 | Connell et al. | 705/1 |
| 5,233,532 A | 8/1993 | Ramsden | 364/464.03 |
| 5,262,597 A | 11/1993 | Johnson, Jr. | 177/50 |
| 5,313,404 A | 5/1994 | Wu | 364/478 |
| 5,331,118 A | 7/1994 | Jensen | 177/25.14 |
| 5,340,948 A | 8/1994 | Ramsden | 177/25.15 |
| 5,369,221 A | 11/1994 | Ramsden | 177/25.15 |
| 5,446,667 A * | 8/1995 | Oh et al. | 705/406 |
| 5,481,464 A | 1/1996 | Ramsden | 364/464.03 |
| 5,586,037 A | 12/1996 | Gil et al. | 364/464.03 |
| 5,602,742 A | 2/1997 | Solondz et al. | 705/410 |
| 5,656,799 A | 8/1997 | Ramsden et al. | 177/2 |
| 5,831,220 A | 11/1998 | Ramsden et al. | 177/1 |
| 5,917,925 A * | 6/1999 | Moore | 382/101 |
| 6,061,057 A * | 5/2000 | Knowlton et al. | 345/335 |

\* cited by examiner

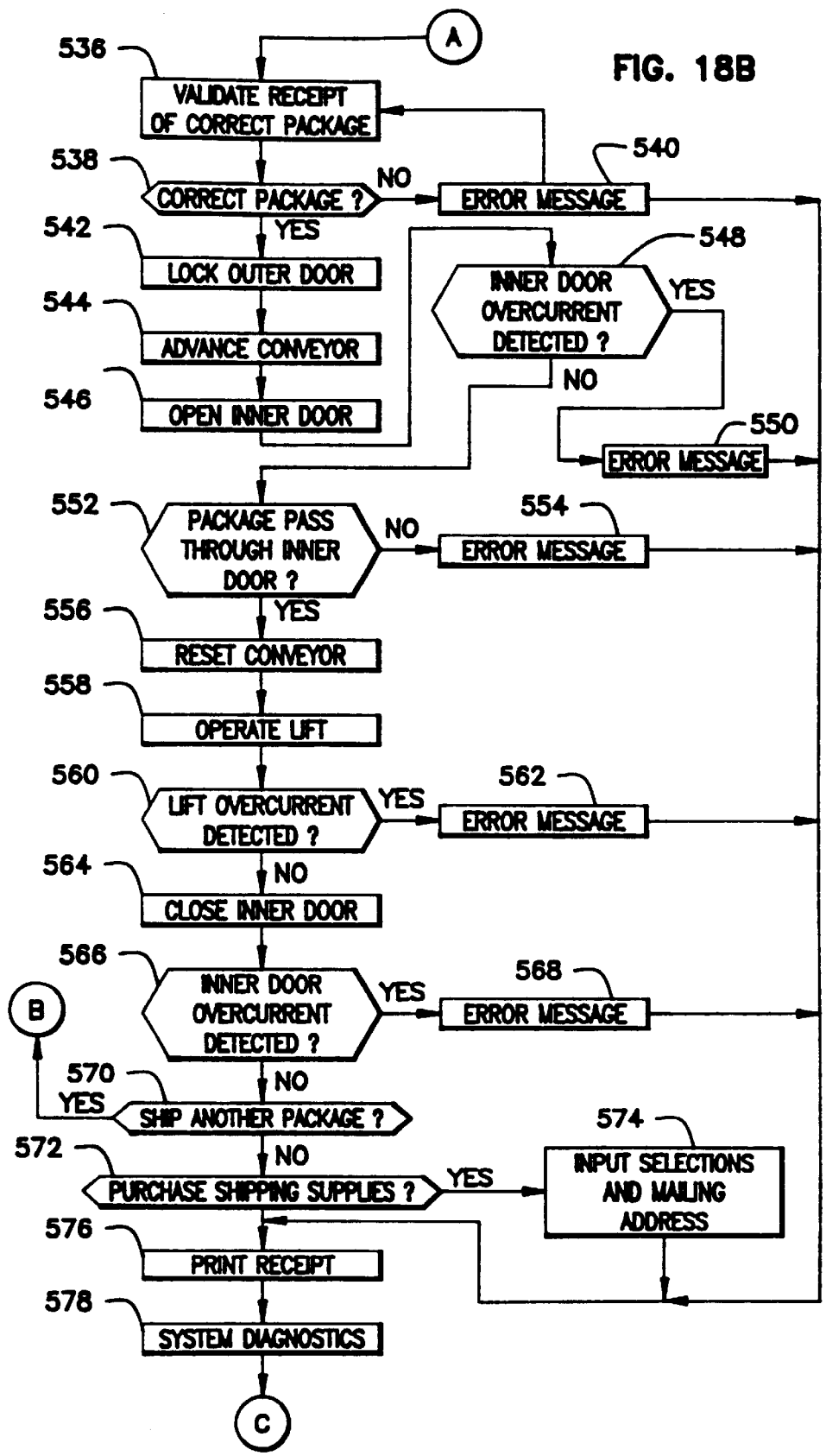

AUTOMATED PACKAGE SHIPPING MACHINE

This Application: is a continuation of U.S. patent application Ser. No. 09/162,874, filed Sep. 29, 1998, now U.S. Pat. No. 6,105,014, which is a Continuation of application Ser. No. 08/845,012 filed Apr. 27, 1997, U.S. Pat. No. 5,831,220, which was a division of Ser. No. 08/235,290, filed Apr. 29, 1994, now U.S. Pat. No. 5,656,799, which was a CIP of Ser. No. 07/903,342, filed Jun. 24, 1992, now U.S. Pat. No. 5,340,948, which was a CIP of Ser. No. 07/683,243, filed Apr. 10, 1991, now U.S. Pat. No. 5,233,532.

BACKGROUND OF THE INVENTION

1. Field of the Invention

This invention relates to the commercial shipping and delivering industry. More specifically, this invention relates to an automated unit for preparing an appropriate mailing label, for validating receipt from a customer of a parcel, package, letter or other item for shipment, and/or for collecting and holding parcels, packages, letters and other items for pick-up by one or more commercial delivery services.

2. Description of the Prior Art

Individuals and companies rely heavily on commercial delivery services to transport letters and packages to intended addresses and recipients throughout the world. Commercial delivery services compete intensely both in terms of pricing and service. The amount of time that it takes a commercial delivery service to deliver an item to its destination is critical to the shipment of many items. To meet this demand, many commercial delivery services offer an overnight or "next-day mail" service for a premium price. Price competition for overnight and other service is very intense, and it is particularly important that shipped items be collected, transported and distributed quickly and on a cost-effective basis.

Some delivery services operate unattended drop-boxes in which a customer may place a pre-addressed package or letter. This is done with specialized envelopes which are distributed by the delivery service; often such envelopes include an account number for the customer and a tear-off receipt that the customer may keep after mailing the package. Such schemes, however, cannot provide full insurance protection or verification that the package was in fact mailed, since no attendant is present to verify that the letter was actually placed in the box. In addition, present-day unattended drop-boxes cannot accept packages because packages need to be pre-weighed and sized before they can be accepted for shipment. Another disadvantage of unattended drop-boxes is that they are generally inaccessible to customers who do not have a pre-assigned customer account or specialized mailing envelope. Such systems are also necessarily limited in the size and shape of items that they will accept for shipment.

Most delivery services also operate staffed offices in large towns and cities which can accept items of most sizes for shipments, and give verified receipts to the customer. Such offices can generally be used by persons who do not have a special account number with the company, but are usually limited in the hours of operation. Such offices have a relatively high overhead cost for the company that operates them; this limits the number of such offices that a company can maintain. As a result, many persons and companies seeking overnight or other expedited delivery service must either drive to the nearest office, which might be many miles away, or, if feasible, use a drop-box which does not give a verified deposit receipt.

It is clear that a long and unfilled need in the art has existed for a system which accepts and stores items for subsequent pick-up by a commercial carrier which is inexpensive to maintain and service, which gives a verified deposit of receipt, which accepts items of different sizes and shape for shipment, and which can be accessed by persons and companies who do not have a pre-existing relationship with the delivery service or services.

SUMMARY OF THE INVENTION

Accordingly, it is an object of this invention to provide a system which can accept and store items for subsequent pick-up by a commercial carrier.

It is further an object of this invention to provide such a system which is inexpensive to deploy and maintain at a fixed location.

It is further an object of this invention to provide such a system, which can accept letters and packages of different shapes and sizes, and size and weigh shipments prior to acceptance.

It is further an object of the invention to provide a system for accepting and storing items for shipment by a commercial carrier which is accessible to persons and companies who do not have a pre-existing business relationship with the carrier or carriers.

It is further an object of the invention to provide a system for accepting and storing items for subsequent pick-up by a commercial carrier which is capable of giving a verified deposit of receipt to a customer.

It is further an object of the invention to provide a system for printing an appropriate mailing label with the appropriate fee for shipment and for providing a mechanism for verified receipt of an item to be shipped.

Furthermore, it is an object of the invention to provide a system for accepting and storing items for subsequent pick-up which can be used and operated by several different, competing, commercial delivery services.

In order to achieve the above and other objects of the invention, a method of mailing parcels and envelopes using an automated shipping machine according to a first aspect of the invention includes the steps of receiving payment information from a customer; receiving package type information identifying the parcel or envelope to be mailed; weighing the parcel or envelope to be mailed; determining length, width and height dimensions of the parcel or envelope to be mailed; receiving shipping information from the customer including at least a destination of the parcel or envelope to be mailed; computing from the package type information, shipping information, and length, width, height and weight measurements of the parcel or envelope, a delivery date and cost for delivery of the parcel or envelope to the destination via each delivery service option available to the customer; receiving an indication of the delivery service option chosen by the customer; providing a shipping label including at least the destination printed thereon; receiving the parcel or envelope with the shipping label applied thereto; validating that the parcel or envelope received in the receiving step is the parcel or envelope for which the shipping label was printed in the shipping label providing step; securely storing the parcel or envelope in a secure storing area inaccessible to the customer when it is determined in the validating step that the parcel or envelope received in the receiving step is the parcel or envelope for which the shipping label was printed in the shipping label providing step; providing the customer with a shipping receipt for an amount including at least the cost of delivering the parcel or envelope to the destination via the delivery service chosen by the customer; and storing the parcel or envelope in the secure storing area until subsequently picked up by a commercial delivery person.

Such a method is implemented by an automated shipping machine including a device for receiving payment information from a customer; a scale for weighing a parcel or envelope to be mailed; a measuring apparatus for determining length, width and height dimensions of the parcel or envelope to be mailed; a processing system for receiving package type information identifying the parcel or envelope to be mailed, shipping information from the customer including at least a destination of the parcel or envelope to be mailed, for computing from the package type information, shipping information, weight information from the scale, and length, width, and height measurements from the measuring apparatus, a delivery date and cost for delivery of the parcel or envelope to the destination via each delivery service option available to the customer, and for receiving an indication of the delivery service option desired by the customer; a printer responsive to the processing system for printing a shipping label including at least the destination printed thereon and for printing a shipping receipt for an amount including at least the cost of delivering the parcel or envelope to the destination via the delivery service chosen by the customer; a validation area for accepting the parcel or envelope, the validation area being inaccessible by the customer and comprising a system for validating whether the parcel or envelope received therein is the parcel or envelope for which the shipping label was printed by the printer; and a secure storage area adjacent the validation area for securely storing the parcel or envelope validated by the validating system, the secure storage area storing the validated parcel or envelope until the parcel or envelope is subsequently picked up by a commercial delivery person.

According to another aspect of the invention, a system is disclosed for accepting and storing parcels for subsequent pickup by a commercial carrier. Such a system includes an outer housing having inner and outer surfaces, the inner surface defining a storage area which is constructed and sized to store a multiplicity of parcels; a deposit system, connected to the outer housing, for permitting a customer to deposit the parcel into the storage area, the deposit system comprising a conveyor for moving the parcel into the storage area; an input device for inputting information relating to the destination of the parcel from the customer; a scale for weighing the parcel when the parcel is positioned on the conveyor; and a control system for calculating a shipment fee for the parcel from at least the weight and destination information.

According to yet another aspect of the invention, a system for accepting and storing parcels for subsequent pickup by a commercial carrier is provided which includes an outer housing having inner and outer surfaces, the inner surface defining a storage area which is constructed and sized to store a multiplicity of parcels; a secure deposit system, connected to the outer housing, for permitting a customer to deposit the parcel into the storage area, the secure deposit system comprising a holding space that is defined in part by a support surface and an outer door, the outer door being constructed and arranged to deny access to the holding space after a parcel has been deposited on the support surface, the secure deposit system further comprising a system for moving the package from the holding space to the storage area; an input device for inputting information relating to the destination of the parcel from the customer; a scale for weighing the parcel when the parcel is positioned in the holding space, whereby a customer will not be able to interfere with the weighing; and a control system for calculating a shipment fee for the parcel from at least the weight and the destination information.

According to still another aspect of the invention, a system is provided for accepting and storing parcels for subsequent pickup by a commercial carrier. This embodiment includes an outer housing having inner and outer surfaces, the inner surface defining a storage area which is constructed and sized to store a multiplicity of parcels;

a scale for weighing a parcel which a customer intends to ship; an input device for inputting information relating to the destination of the parcel from the customer; a control system for calculating a shipment fee for the parcel, the control system being in communication with the scale and the information inputting system; a secure deposit system, enabled by the control system, for permitting a customer to securely deposit the parcel into the storage area; and a stacking system in the storage area for stacking the parcel in the storage area, whereby the volume of the storage area will be efficiently utilized.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 18A and 18B constitute a flow chart depicting operation of the apparatus illustrated in FIGS. 11–17;

DETAILED DESCRIPTION OF THE PREFERRED EMBODIMENTS

Embodiment of FIGS. 1–6

Figure 1:
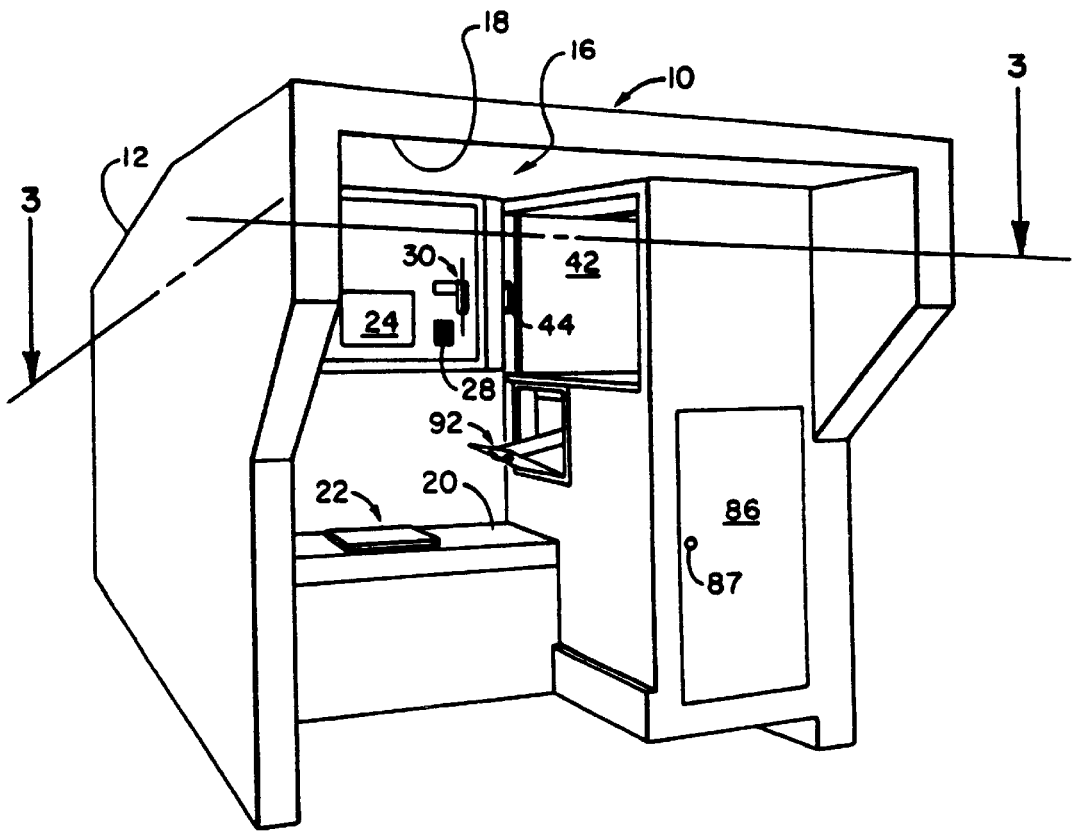
FIG. 1 is a perspective view of an unmanned mail collection apparatus constructed in accordance with a first embodiment of the invention.
Figure 2:
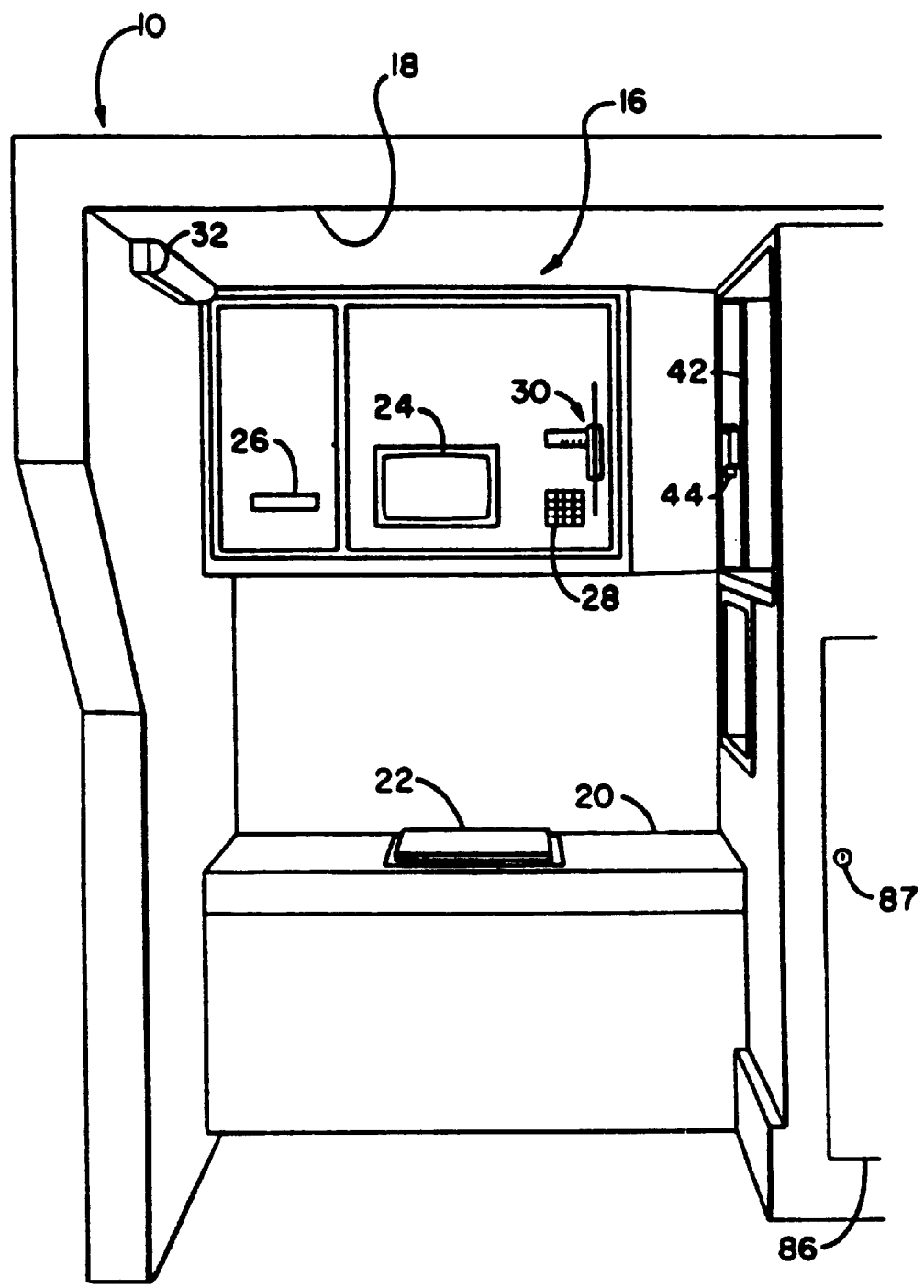
FIG. 2 is a partial front elevational view of the apparatus illustrated in FIG. 1.

In the drawings, wherein like reference numerals designate corresponding structure throughout the views, and in particular in FIGS. 1–4, a system 10, constructed according to a first embodiment of the invention for accepting and storing items for subsequent pick-up by a commercial carrier, includes an outer housing 12 which defines a storage area 14 for holding items such as packages or parcels. As best shown in FIGS. 1 and 2, system 10 further includes a customer interface area 16 which is positioned beneath a hooded overhang 18. Hooded overhang 18 provides privacy and shelter from the elements to a customer during use of the system 10. Interface area 16 includes a horizontal platform 20 upon which packages, parcels or personal items can be placed by a customer. Measuring indicia (not shown) are also preferably printed on platform 20 and on adjacent vertical walls of the housing 12 so that a customer can quickly measure the external dimensions of the item he or she intends to ship. An electronic scale 22 is provided on platform 20 for weighing an envelope, parcel or package prior to its mailing, as will be described in greater detail below. Customer interface area 16 further includes a CRT video display terminal 24, a printer 26, a key pad 28 and a magnetic card reader 30, for purposes which will be described in greater detail below. Instead of card reader 30, the system 10 could alternatively include other means for payment, or for identifying the customer for later billing. A lamp 32 is provided on an underside of the hooded overhang 18 to provide illumination to the customer interface area 16, as may be seen in FIG. 2.

Figure 3:
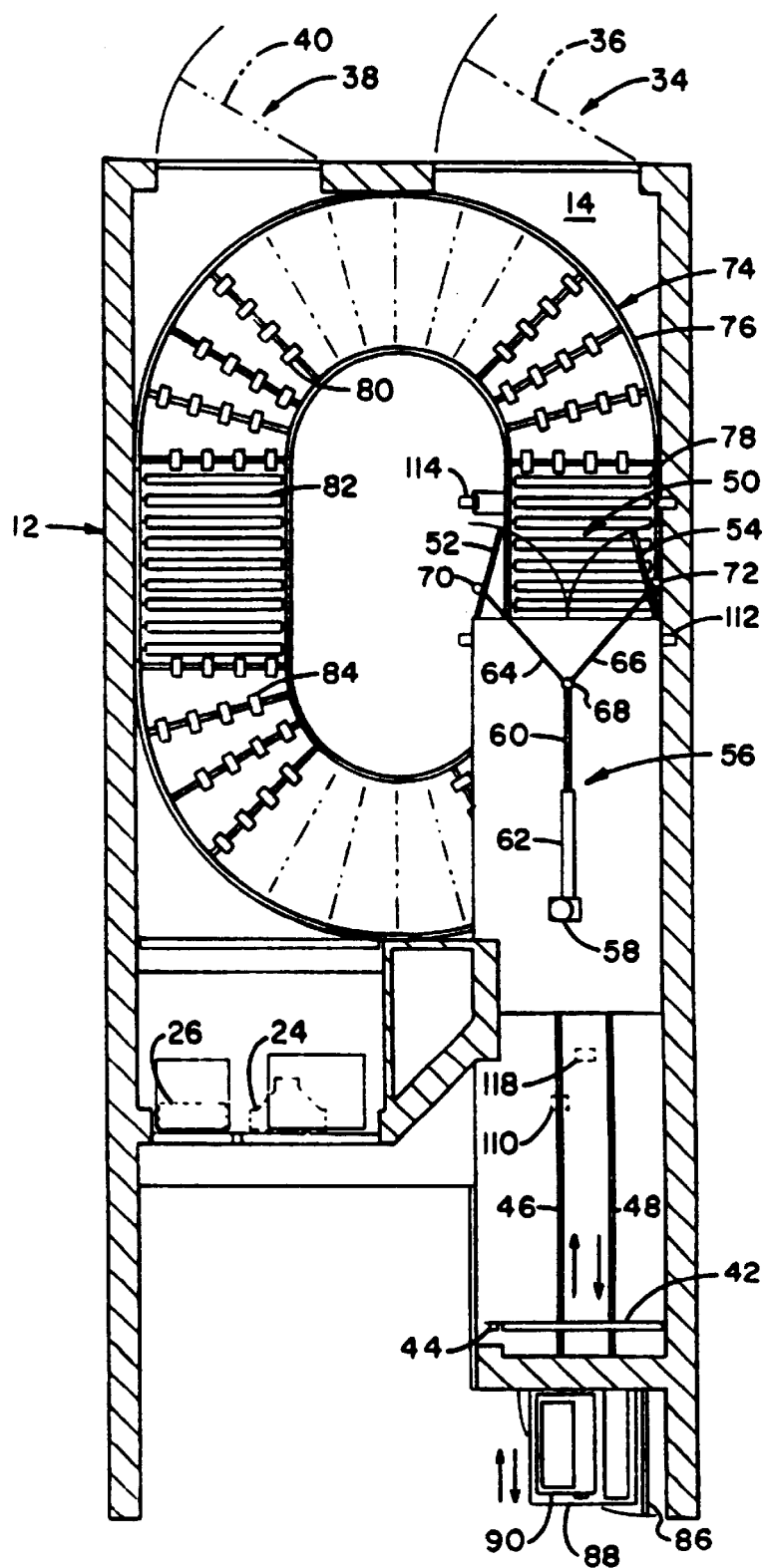
FIG. 3 is a top sectional view taken generally along lines 3—3 in FIG. 1.

As shown in FIG. 3, a back wall of outer housing 12 has a first service access opening 34 defined therein which is selectively openable and closable by a first door 36. First door 36 includes a key-type lock (not shown) which, desirably, can be opened only by service personnel or representatives of client delivery services. A second service access opening 38 is also defined in the back wall of outer housing 12 and is accessible via a second door 40. Second door 40 is also provided with a key-type lock (not shown) which, preferably, is also openable only by service personnel or representatives of client delivery services. The purpose of first door 36 and second door 40 during operation of the system 10 will be discussed in greater detail below.

As shown in FIGS. 1 and 3, an outer door 42 having a handle 44 is positioned to the upper right of the customer interface area 16. Outer door 42 is mounted for linear movement in a horizontal plane by a pair of linear bearings which include a first guide track 46 and a second guide track 48. The guide tracks 46, 48 extend flush with or beneath a smooth horizontal surface upon which a package or parcel may be placed.

To prevent unauthorized access to storage area 14, a security mechanism 50 includes a pair of inner doors 52, 54 which are openable and closable by an inner door closing mechanism 56. Closing mechanism 56 includes a stepper motor 58 which is arranged to extend and retract an extendable member 60 through a suitable mechanical transmission arrangement, such as a pinion and rack arrangement. Extendable member 60 is slidably received within a casing 62, as may be seen in FIG. 3. A first link 64 and a second link 66 are pivotally connected to a distal end of extendable member 60 at a pivot point 68, as may further be seen in FIG. 3. Second, opposite ends of the first and second links 64, 66 are connected to the first and second inner doors 52, 54 at pivot points 70, 72, respectively. When stepper motor 58 is operated in a first rotary direction, extendable member 60 will extend out of casing 62, opening the inner doors 52, 54. When stepper motor 58 is caused to rotate in a second, opposite direction, extendable member 60 will retract into casing 62, thereby closing the inner doors 52, 54. A more detailed description of the function of security doors 50 within the overall context of system operation is provided hereinbelow.

As shown in FIG. 3, a guide structure 74 is provided for guiding an item such as package or parcel from the rear end of the guide tracks 46, 48 to a deposit area on the floor of storage area 14. As shown in FIG. 3, guide structure 74 is constructed as a spiral guide track 76, which includes an alternating series of high speed and slow roller sections. As shown in FIG. 3, guide track 76 includes a first set of slow rollers 78, which are positioned at the uppermost, initial approach area of the guide track 76. The entire guide track 76 inclines downwardly throughout both the curved and straight areas, so that a package or parcel placed thereon will roll under its own weight to the bottom of track 76 at the deposit area near the floor of storage area 14. It should be made clear that the first set 78 of slow rollers extends beneath inner door closing mechanism 56 to the rear end of guide tracks 46, 48, so that a package or parcel placed behind outer door 42 will be positioned on the guide track 76 when the outer door 42 is moved to its rearward, closed position. At this point, only the security doors 50 will stop the package or parcel from rolling unimpeded along the guide track 76, and only if the doors 52, 54 are in their closed position. Guide track 76 includes a high speed curved roller area 80 at the lower end of the first section 78 of slow rollers which is characterized by larger, low friction rollers which will allow the parcel or package to travel at a higher speed than the parcel or package travelled on the slow roller section 78. A second section 82 of slow rollers are provided at the lower end of first high speed roller section 80 to keep the parcel or package from attaining too high of a speed. A second high speed roller section 84 is provided at the lower end of second slow roller section 82. A third slow roller section (not shown) is positioned at the lower end of second high speed roller section 84 to slow the package or parcel as it approaches the deposit area near the floor of storage area 14. The guide track 76 terminates near the floor of storage area 14, at a point which is adjacent to the first service access opening 34. As a result, service personnel or representatives of client delivery services can retrieve parcels or packages from storage area 14 conveniently by unlocking and opening first door 36.

Figure 4:
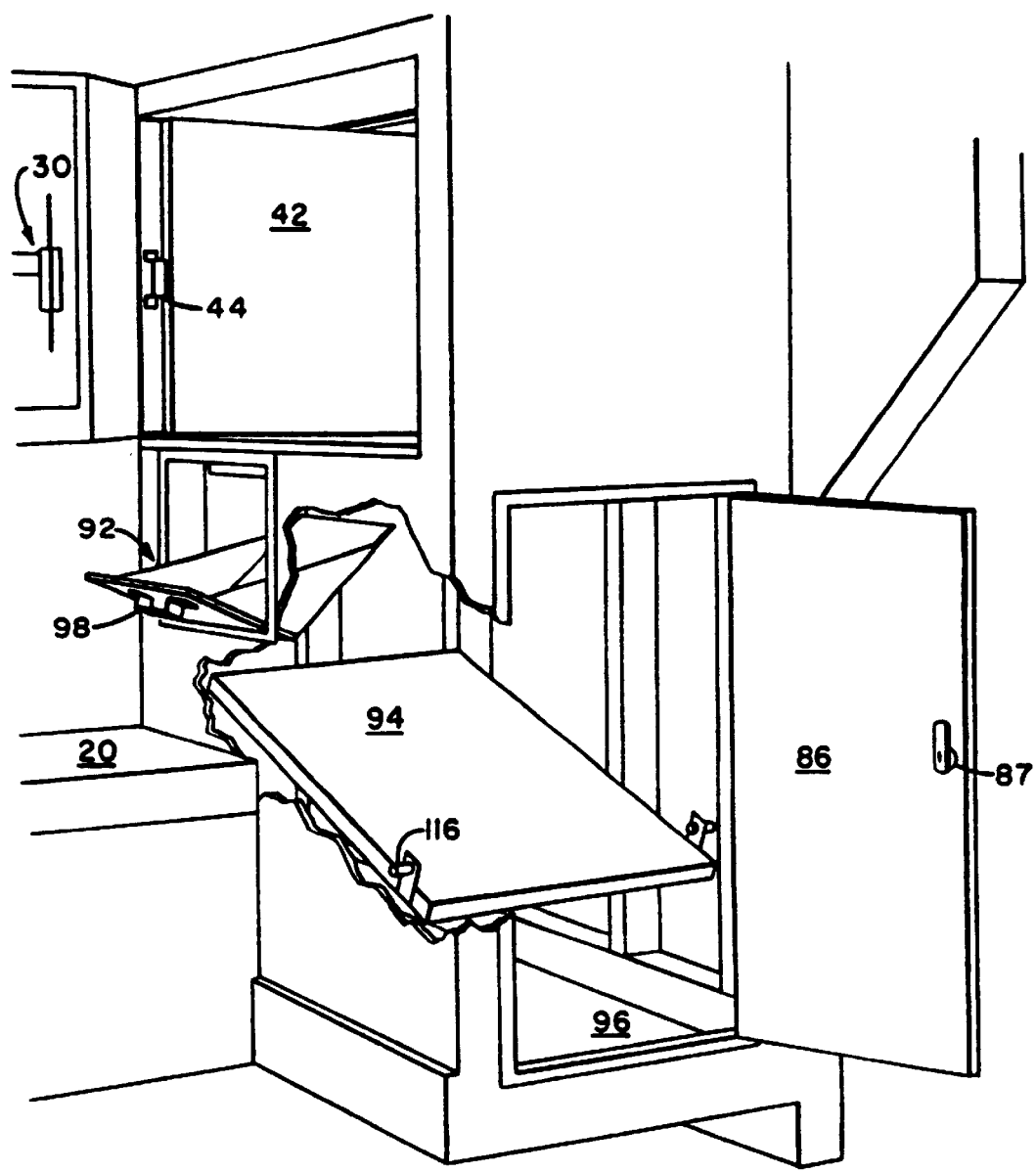
FIG. 4 is a perspective fragmentary view of a portion of the apparatus illustrated in FIGS. 1–3.

Referring now to FIGS. 1, 3 and 4, a manifest access door 86 is provided in a forward wall of outer housing 12, immediately to the right of customer interface area 16. Manifest access door 86 is provided with a lock 87 which is, preferably, openable only by service personnel or representatives of client delivery services. A manifest printer 90 is provided on an upper surface of a platform 88 which is slidably mounted on bearings so as to be extendable from the outer housing 12 when the manifest access door 86 is opened. The purpose of manifest printer 90 will be discussed in greater detail below.

As shown in FIG. 4, system 10 further includes a dump drop option for the mailing of small envelopes and similar items. Dump drop 92 includes a pivotable drawer which has a handle 98 and is similar to the drawers on commercial drop-boxes or those which are used by the U.S. postal service. Positioned beneath the pivotable drawer is an inclined low friction chute 94 which inclines downwardly to a location above a collection space 96. When an envelope is placed in the pivotable drawer of dump drop 92 and the drawer is allowed to pivot back to its closed position, an envelope will fall onto the incline chute 94 and slide downwardly, finally dropping into the collection space 96. Chute 94 is positioned beneath the slidable platform 88 for the manifest printer 90, which are not shown in FIG. 4 for purposes of clarity.

Figure 5:
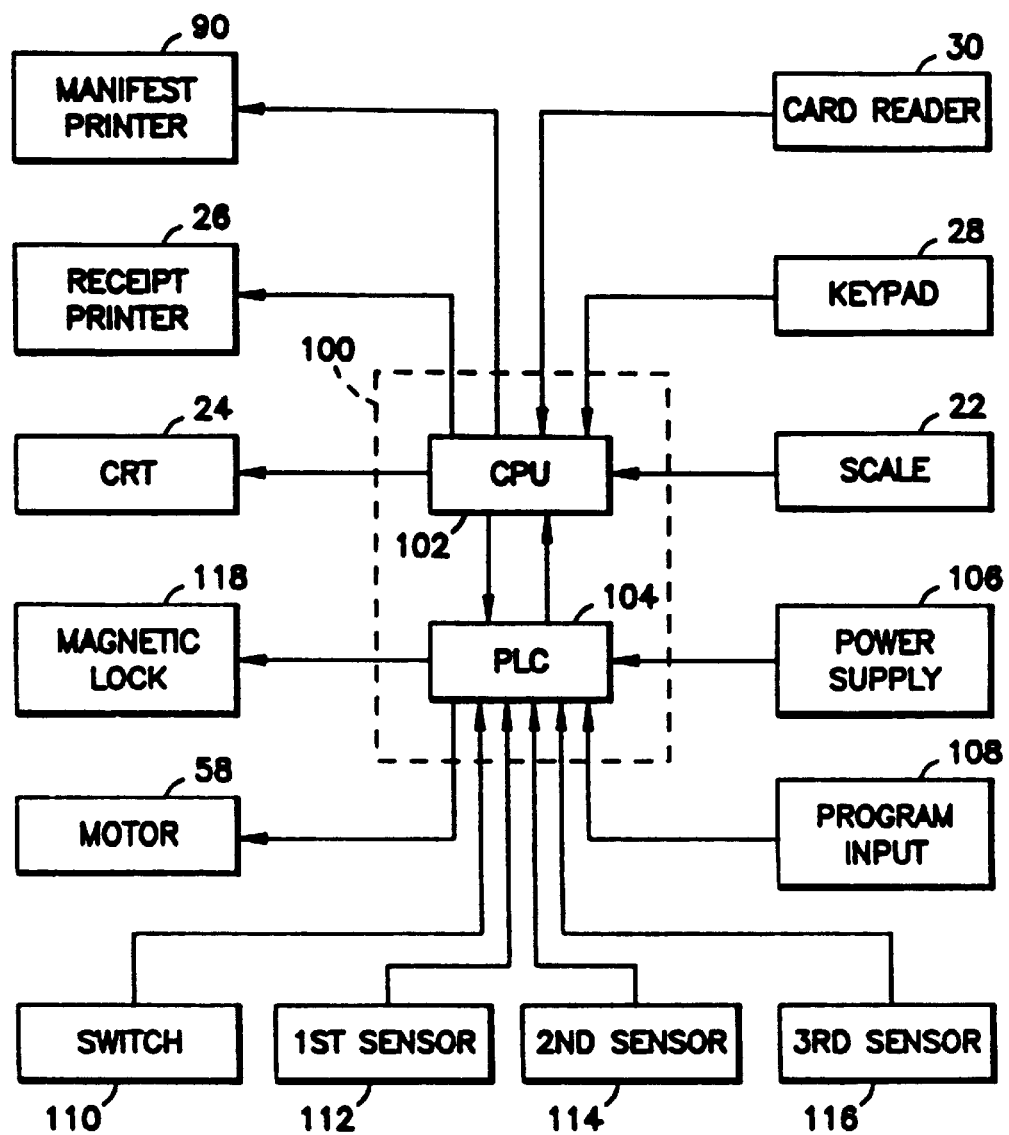
FIG. 5 is a schematic view of a control system for the apparatus illustrated in FIGS. 1–4.

One important aspect of system 10 is the provision of a control system 100 which coordinates various sensors, motors, and input/output devices throughout the system. Control system 100 is schematically illustrated in FIG. 5, and includes a central processing unit (CPU) 102 which is in two-way communication with a program logic controller (PLC) 104. Inputs to the CPU 102 include the electronic scale 22, the key pad 28, and the magnetic card reader 30, all of which are positioned in the customer interface area 16 that was described above. Outputs from the CPU 102 include the manifest printer 90, the printer 26 in the customer interface area 16, and the video display terminal 24.

The PLC 104 receives input and outputs to the CPU 102, as is schematically indicated in FIG. 5. Additionally, the PLC 104 directly receives input from a power supply 106, which provides power to the control system 100 and the various electrical components of the system 10. PLC 104 also receives input from a program input component 108, which in a preferred embodiment is a keyboard (not shown) provided in a panel behind the customer interface area 16. The PLC 104 is preferably a read only memory (ROM) which can receive programming input only from input device 108. Thus, all of the software which controls the operation of PLC 104 is received through input device 108. PLC 104 also directly receives input from a two-position switch 110, which monitors the position of outer door 42 by reversing position each time outer door 42 passes over the sensor switch 110. The position of sensor switch 110 is indicated in FIG. 3 of the drawings, and preferably is approximately 12 inches from the rear end of the guide tracks 46, 48. PLC 104 also receives input from a first photocell sensor 112, which is positioned above the guide track 76 at a location which is slightly forward of the security doors 50. PLC 104 also receives input from a second photocell sensor 114, which is also positioned slightly above guide track 76 at a location which is rearward or downstream from the security doors 50. A third photocell sensor 116 is provided at the bottom of the inclined chute 94 and the dump drop system 92 illustrated in FIG. 4. Third photocell monitor 116 further provides input to PLC 104.

In operation, the system 10 is deployed to a location which is considered convenient to potential customers. This may be a hotel lobby, a service station, a business establishment, or other location. Once positioned, control system 100 is programmed to interface with potential customers. To do this, a specialized programmer person uses program input device 108 to load the appropriate zone and weight charts for all client delivery services into the PLC 104. Next, the programmer loads the corresponding fee files which correspond to each client delivery service at that desired location. At this point in time, the system is ready to interact with potential customers.

First, a customer approaches the customer interface area 16, and lays whatever personal effects he or she may have upon the platform 20. The customer then measures the dimensions of the item being shipped on the indicia which is provided on or about platform 20. The video display terminal or screen 24 at this point displays a prompt which instructs the customer to place the envelope, parcel or package on electronic scale 22 and instructs the customer to push a start button on key pad 28 to initiate a deposit. Once control system 100 receives input from electronic scale 22 and the start button, it evaluates the input to check whether the package, parcel or envelope exceeds a pre-determined weight maximum, which preferably is approximately 70 pounds. If the package exceeds the pre-determined maximum, control system 100 displays a message on video display terminal 24 to the effect that the system cannot accept packages which exceed the predetermined maximum weight. If the package is within the predetermined weight maximum, control system 100 displays a prompt on video display terminal 24 which instructs the customer to pass a magnetic credit or debit card through magnetic card reader 30. Preferably, system 10 is compatible with most commercial bank cards, as well as any proprietary cards that its commercial client delivery services may issue. After the customer has passed a magnetic card through reader 30, control system 100 evaluates the information received from card reader 30 and determines whether or not the card information meets certain predetermined characteristics. Those characteristics may be the type of card, the expiration date, and whether the card is listed in the CPU memory as a "bad" card. If the information does not meet these criteria, the control system 100 displays a prompt on terminal 24 to pass the card through reader 30 a second time. If the card information is approved by system 100, system 100 will display a prompt on terminal 24 which asks for a phone number where the customer can normally be reached. After the customer enters a phone number through key pad 28, system 100 evaluates the number to see whether it meets predetermined criteria, such as whether the number is either seven or ten digits. If it does not, system 100 displays a second prompt on terminal 24 which asks the customer to reenter the number. If the number meets the selected criteria, system 100 displays a screen which requests the customer to enter the desired zip code of the item which is to be mailed. The customer then enters the destination zip code through key pad 28, and the system 100 evaluates the code against certain criteria, such as whether exactly five digits have been entered. If the criteria are not met, a screen is displayed which instructs the customer to re-enter the zip code. If the zip code that is entered by the customer meets the predetermined criteria, system displays a screen on terminal 24 which instructs the customer to enter the value of the item that is being deposited. The customer then enters the value of the item through key pad 28. This information is evaluated by system 100 and compared with certain criteria, such as whether it exceeds a predetermined maximum. If the information does not meet the criteria, the system displays a screen on terminal 24 which instructs the customer to re-enter the evaluation information. If the entered value meets the criteria, system 100 will display a screen which instructs the customer to enter the size of the package. Once the customer enters the size of the package through key pad 28, the system will automatically re-weigh the package without informing the customer. If control system 100 determines that the weight of the package has changed since the original weighing, it will display a screen on terminal 24 which warns the customer against touching the package. At that point, control system 100 again re-weighs the package. Once a consistent weight reading is achieved, or if the package weight has remained unchanged since the original reading, system 100 will automatically calculate the charges that are to be applied to the credit or debit card account and will then display a screen on terminal 24 which requests the customer to enter the preferred mode of transportation for the item. At this point, a menu of the fees different services would charge may appear, and the customer can specify which commercial delivery service he or she would like to use by entering the appropriate information through key pad 28. Once this information is received by system 100, system 100 will display a screen on terminal 24 which asks the customer whether the customer would like to change any previous entries. If the customer responds through key pad 28 in the affirmative, the system 100 will display a screen on terminal 24 which allows the customer to select which input the customer would like to change, and, upon entry of the appropriate information by the customer, will allow the customer to change previously-input data.

If the customer indicates that all of the previously-input information is still valid, or if all incorrect information has been re-entered correctly, control system 100 will actuate printer 26 to print a mailing label for the package. Preferably, printer 26 is equipped with a peel-type laminated label material which can be peeled off to expose an adhesive backing. Once the label is printed, the customer peels the back off of the label, and places the label on the item that is to be mailed. At this point, control system 100 displays a screen on terminal 24 which instructs the customer to take the label from the printer, to write the mailing address onto the label, to place the label on the package, and to place the envelope or package in the appropriate door. If, because of the previously-input information, control system 100 determines that the item to be mailed is an envelope, it instructs the customer to place the envelope into the dump drop 92. At this point, control system 100 will take no further action until it receives input from the third photoelectric sensor 116 that an envelope has indeed travelled down inclined chute 94 and into the collection space 96.

If, because of the previously-input information, control system 100 determines that a package or parcel is to be mailed, control system 100 will unlock a magnetic lock 118, which will permit the customer to slide outer door 42 to its forward position by pulling on the handle 44. As the customer pulls the outer door 42 to its forward position, switch 110 will be actuated, thus verifying to control system 100 that outer door 44 has been opened. Once switch 110 is actuated, control system 100 will actuate stepper motor 58 to close the inner security doors 52, 54 in a manner that has been previously described. At this point, the customer will place the parcel or package on the flat surface immediately to the rear of outer door 42. The customer will then push outer door 42 toward its closed position, thus pushing the parcel or package onto the first set 78 of slow rollers on the spiral guide track 76 and, in the process, returning the outer door position sensor switch 110 to its original position, which indicates to the control system 100 that the outer door has been closed. The parcel or package will be pushed into a temporary holding space between the outer door 42 and the security doors 50. The system 100 will then actuate magnetic lock 118 to ensure that the outer door 42 is completely closed. When the first sensor 112 (or the third sensor 116 in the case of the dump drop) senses the presence of an envelope, parcel or package, control system 100 stores information relating to the transaction in CPU 102. Once the signal from switch 110 reaches the control system 100, control system 100 will instruct stepper motor 58 to turn in a second direction, thereby opening the security doors 52, 54 in the previously described manner. At this point, the package or parcel rolls down the spiral guide track 76, and passes through the second photocell monitor 114. The package or parcel will continue to roll on guide track 76 to the deposit area near the floor of storage area 14. If the second photocell monitor 114 remains actuated, the control system 100 assumes that the storage area 14 is full, and the system 10 will no longer accept parcels or packages. If second monitor sensor 114 does not remain actuated, control system 100 displays a screen on terminal 24 asking the customer whether the customer would like to mail another item. If the customer responds in the affirmative, the entire process except for the phone number request and credit card check is repeated. If the customer replies in the negative, the control system 100 instructs printer 26 to print a verified deposit of receipt for the customer. At this point, the control system 100 will display a new screen on terminal 24 thanking the customer for his or her business.

At any point in the process, the process is cancelled after a certain amount of time if the customer does not respond to a screen, in case the customer decided to leave.

Control system 100 also provides a master control screen for use by maintenance personnel during servicing of the system. To cause the system 100 to display the master control screen on terminal 24, a maintenance person must enter a predetermined code into the key pad 28. A password must be entered and verified by the system 100. Once the password has been verified, control system 100 will display a screen on terminal 24 which presents the service person with four different options. The first option is to return to the main program, which will terminate the master control screen. The second option is to print the package history log. If this option is selected, control system 100 will print the log of all packages which have been accepted by the system 10 on the manifest printer 90. At that point, the system 100 will display a second screen on terminal 24 asking whether the log printed satisfactorily. If an affirmative answer is received, the original four options are displayed on the screen. If the answer is negative, a screen is displayed which instructs the maintenance person to align the paper and make sure the printer is on line. After a suitable amount of time, the system 100 will reprint the package log on manifest printer 90.

The third option that is presented on the master control screen is to print the credit card log. If this option is selected, the system 100 will print a log of all credit cards that have been used on the manifest printer 90. After printing, a screen asking whether the log printed satisfactorily will appear on terminal 24. If the answer is affirmative, the original four options will again be displayed. If the answer is negative, instructions regarding the alignment of the paper and on-line status of the printer are again displayed, and the process of printing the credit card log is then repeated by control system 100.

The fourth option available on the master control screen is to shut down the program altogether. If this option is selected, the system 10 is rendered inoperative.

Each commercial delivery service which contracts with the owner of the system 10 also has a screen provided for the use of its service personnel. To enter this mode, the delivery service person enters a pre-determined password into the key pad 28. The system 100 verifies whether the password is correct, and, if it is correct, will display a screen which gives the delivery service person four different options that can be performed by the system 10. The first option is to return to the main program, which cancels the screen and returns the system to its customer interface mode. The second option is to print the manifest check-off sheet which, if selected, will print a list of deposits which customers have selected for that particular delivery service in a sheet form which can be checked off by the delivery service person as the packages are retrieved through the first service access opening. At this point, control system 100 displays a second screen on terminal 24 inquiring whether the check-off sheet printed correctly. If the delivery service person responds in the negative, a screen is printed which instructs the delivery person to align the paper and make sure that the printer is on line. Control system 100 then tries to re-print the check-off sheet. If the delivery service person indicates that the check-off sheet printed satisfactorily through key pad 28, the service person, who has previously opened manifest access door 86 to obtain access to the manifest printer 90, will open the first service access door 34 and retrieve the packages which have been selected for his particular delivery service. If any of the packages are found to be unsuitable for shipment in any way, the service person can open the second access door 40, and place the unsuitable packages in a space behind second service access opening 38 which has been reserved for reject packages. The operator of the system 10 can retrieve these packages periodically, and notify the customers by calling the phone number that the customer is required to enter. Once the delivery service person has completed withdrawal of the packages from the storage area 14, he closes and locks the first and second doors 36 and 40. He or she also slides the platform 88 to its retracted position and closes the manifest access door and locks that door as well. A third option which is presented in the delivery service control screen is the option to reject packages. The delivery service person records the numbers of the packages which have been placed in the second service access opening 38. The delivery service person then selects the option to reject packages on the main option screen, and a second screen is generated to request the numbers of the packages that have been rejected. The service person then enters the number of the first package that is to be rejected. The system 100 stores the number of the rejected package in the memory within CPU 102, and then displays a screen asking whether additional packages are to be rejected. The process is repeated until all the rejected packages are loaded into the memory of CPU 102.

The fourth option that is presented in the screen for the delivery service person is the option to print the final manifest. The final manifest is a listing of all transactions which pertain to the particular commercial delivery service. If this option is selected, the manifest printer will print such a summary, and a screen will appear on terminal 24 asking the delivery person whether the manifest printed satisfactorily. If the answer is negative, a screen will appear asking the delivery service person to align the paper and make sure the printer is on line. The control system 100 will then try to reprint the final manifest. Once the delivery service person indicates that the manifest printed in a satisfactory manner, the original four options will appear on the screen 24.

Figure 6:
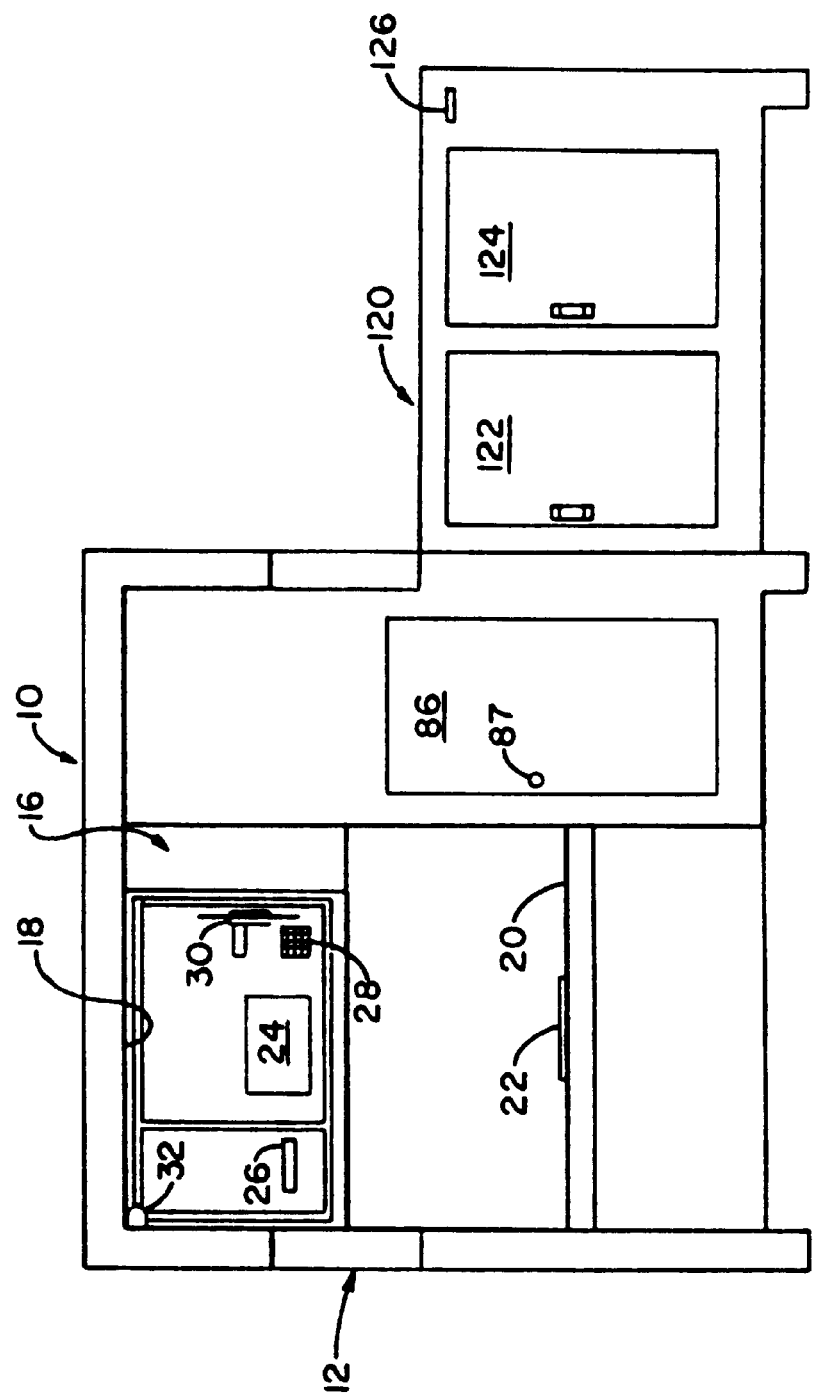
FIG. 6 is a front elevational view of an apparatus constructed in accordance with the first embodiment of the invention but modified to include a packaging supply unit.

A modification of the first embodiment of the invention is illustrated in FIG. 6 of the drawings. In this embodiment, an adjunct packaging supply unit 120 is positioned to one side of the system 10. Packaging supply unit 120 includes a first door 122, a second door 124 and a tape dispenser slot 126. The first and second doors 122, 124 can be open to access packaging materials such as wrapping material, heavy, tape, or writing implements. The dispensing of material through the doors 122, 124 and through the tape dispenser 126 may further be controlled and coordinated through the control system 100.

Embodiment of FIGS. 7–10

FIGS. 7–10 illustrate a system 210 constructed according to a second embodiment of the invention. This embodiment includes an outer housing 212 having an inner surface 216 and an outer surface 214. Except as specifically described herein, system 210 is identical to the system described above in reference to the first embodiment of the invention.

Figure 7:
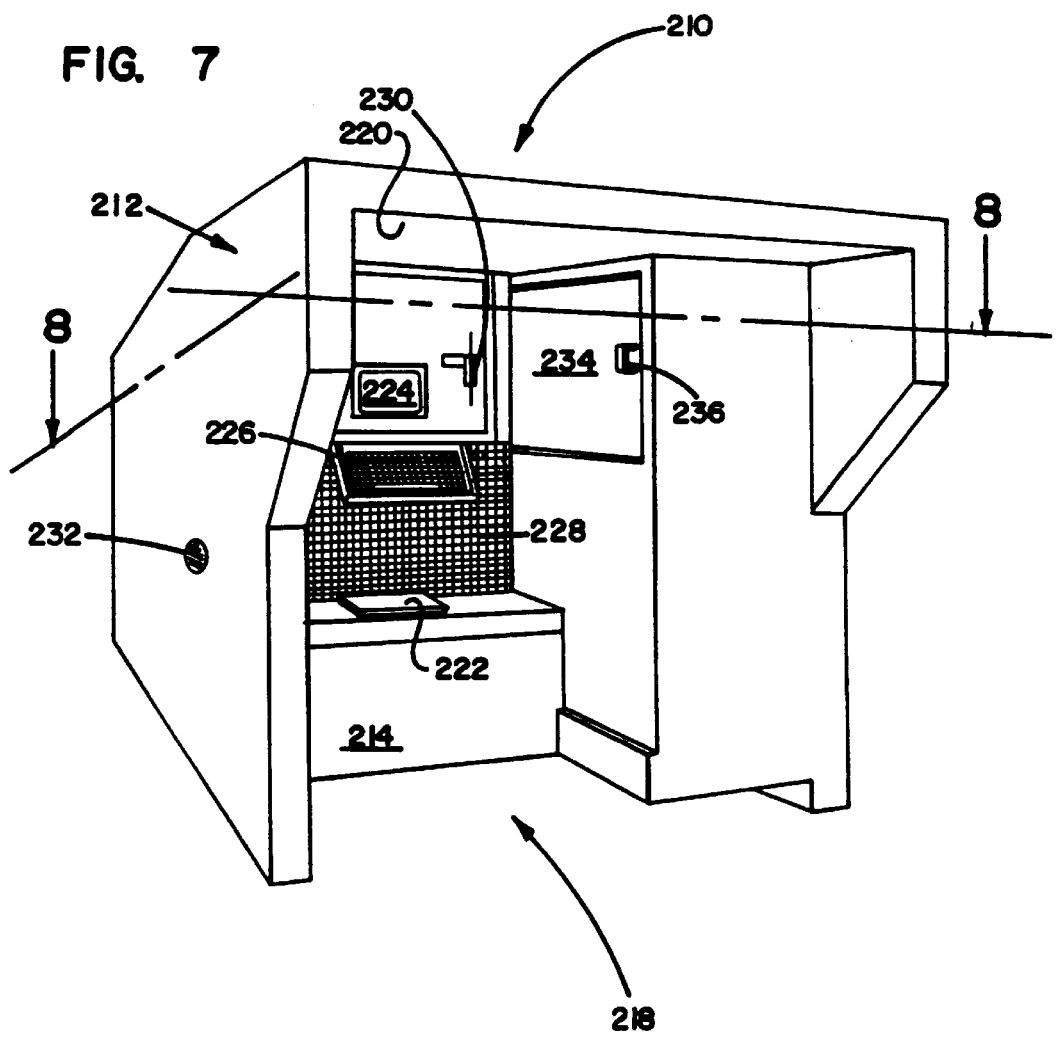
FIG. 7 is a perspective view of an apparatus constructed in accordance with a second embodiment of the invention.

As may best be seen in FIG. 7, a customer interface area 218 includes a hooded overhang 220 for sheltering a customer from bad weather such as rain or snow. An electronic scale 222, a CRT 224 and a keyboard 226 are provided beneath the hooded overhang 220. A grid of evenly spaced lines 228 is provided on a surface of the customer interface area 218 beneath the keyboard 226 and above the scale 222 to assist a customer in measuring a parcel or package which is intended to be posted. A magnetic card reader 230 is also positioned in the customer interface area 218 beneath hooded overhang 220, as is shown in FIG. 7. A ventilation opening 232 is defined in the outer housing 212 of the system 210, as may further been seen in FIG. 7.

Figure 8:
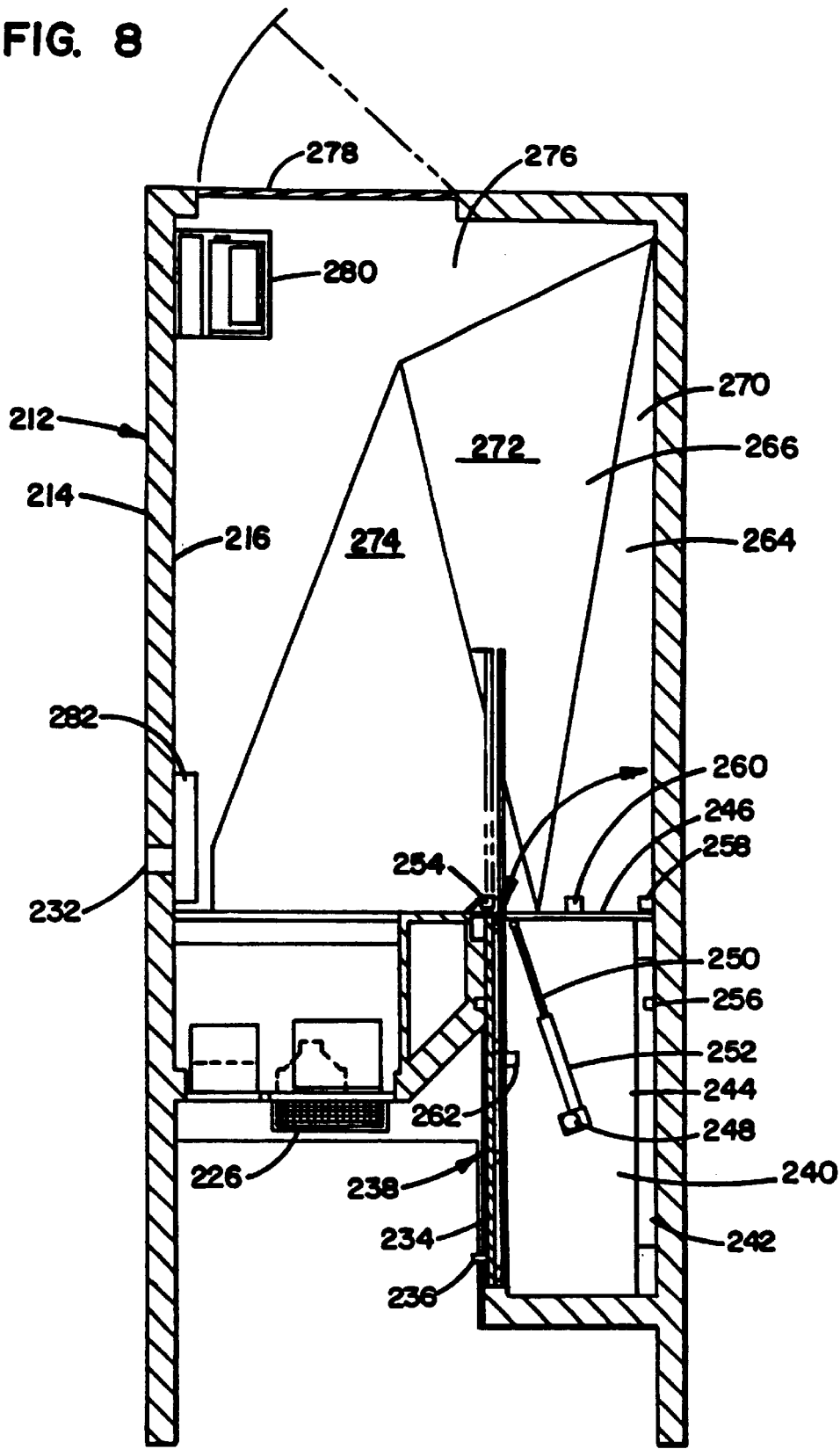
FIG. 8 is a top sectional view taken generally along lines 8—8 in FIG. 7.

FIGS. 7 and 8 further illustrate an improved security deposit system 238 including a sliding outer door 234 having a handle 236 which is positioned for gripping by a customer within the customer interface area 218 beneath hooded overhang 220. Improved security deposit system 238 utilizes a temporary holding space 240 which is partially defined by sliding outer door 234 and a hinged inner door 246. Hinged inner door 246 is arranged to be actuated by a door moving assembly consisting of a stepper motor 248, and an extendable member 250 which is pivotally mounted to inner door 246 at one end thereof and is telescopingly received within a casing 252 at a second end thereof. Stepper motor 248 is itself mounted to outer housing 212 by a pivotal mounting assembly. When stepper motor 248 turns in a first direction, a rack and pinion arrangement causes extendable member 250 to extend from casing 252, thus opening the inner door 246. When stepper motor 248 turns in a second, opposite direction, extendable member 250 retracts within casing 252, thus closing the inner door 246.

Figure 9:
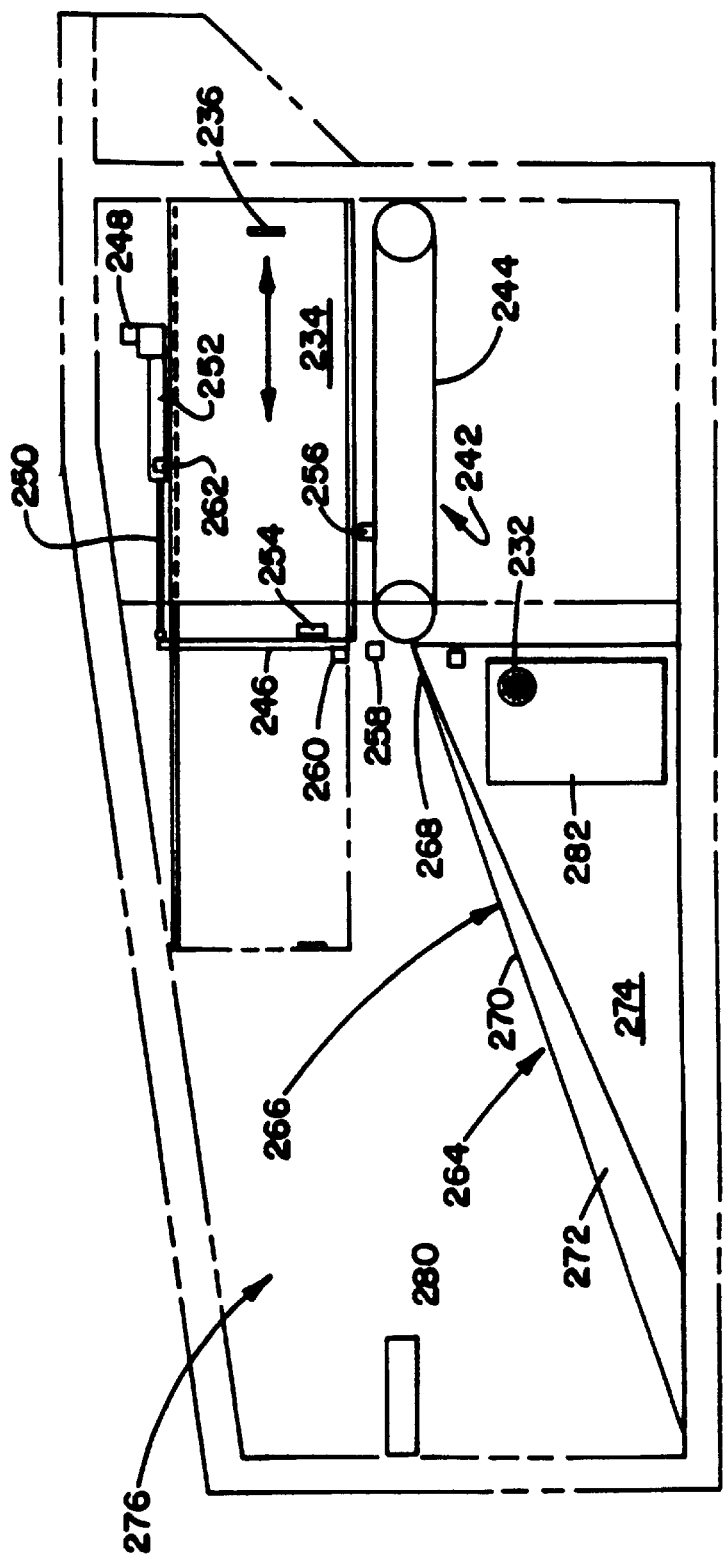
FIG. 9 is a diagrammatical side sectional view of the apparatus illustrated in FIGS. 7 and 8.

As is perhaps best illustrated in FIGS. 8 and 9, sliding outer door 234 is mounted within bearing tracks so as to be slidable between a first closed position, as is illustrated in FIG. 7, and second, open retracted position, as is shown in dashed lines in FIGS. 8 and 9. Sliding door 234 may be locked in its closed position by a magnetic lock 254, which is illustrated in FIG. 8.

As may be seen in FIGS. 8 and 9, a powered conveyer 242 is mounted within system 210 such that an upper run of a conveyer belt 244 thereof defines the bottom surface of the temporary holding space 240. The purpose of powered conveyer 242 is to move a parcel or package placed within temporary holding space 240 by a customer to a passive parcel or package distribution device 264 within a storage area 276 defined within outer housing 211. A first photocell sensor 256 is mounted within temporary holding space 240 such that its detection beam will project parallel to the conveyer belt 244 a predetermined spaced distance above the conveyer belt 244. First photocell sensor 256 is thus positioned inside the inner door 246. A second photocell sensor 258 is positioned outside of the inner door 246, and is likewise spaced a predetermined distance above the plane in which the upper run of conveyer belt 244 extends. A third photocell sensor 260 is mounted so that its detection beam will pass through the plane defined by the upper run of conveyer belt 244. The purpose of photocell sensors 256, 258, 260 will be described in greater detail below.

A mechanical switch 262 is mounted within temporary holding space 240 in such a manner that it is moved to a first position when sliding outer door 234 is moved to the retracted position from the open position, and such that it is moved to a second position when sliding outer door 234 is pulled from the retracted position back to the closed position depicted in FIG. 7. Preferably, switch 262 is actuated by door 234 when door 234 is very close to the closed position. The purpose of switch 262 will be described in greater detail below.

System 210 further includes a passive parcel or package distribution device 264 which is constructed and arranged to distribute parcels or packages received from security deposit system 238 evenly throughout the storage area 276, so that the volume within storage area 276 is utilized more efficiently for storing the parcels or packages than would otherwise be possible. In a preferred embodiment, passive parcel or package distribution device 264 includes a ramp 266 having an upper end 268 which is positioned adjacent to the exit end of the temporary holding space 240. Ramp 266 includes a first slide surface 270, a second slide surface 272, and a third slide surface 274. Slide surfaces 270, 272, 274 are preferably fabricated from a non-corrosive, low friction material and are shaped so that their surfaces converge at the upper end 268 of ramp 266. In the illustrated embodiment, first slide surface 270 is shaped so as to extend along one longitudinal portion of inner surface 216, and gradually increases in width toward the upper end 268 of ramp 266. Second slide surface 272 has a triangular shape, and tapers so as to gradually decrease in width toward the upper end 268 of ramp 266. Third slide surface 274 is shaped so as to also decrease in width toward the upper end 268 of ramp 266. Slide surfaces 270, 272, and 274 are all positioned so as to slope downwardly in different planes, thereby causing a parcel or package sliding on first slide surface 270 to be directed to a different portion of storage area 276 than one on second slide surface 272 or third slide surface 274. Likewise, a parcel or package on second slide surface 272 will be directed to a different portion of storage area 276 than a parcel or package on third slide surface 274. As parcels or packages begin to fill the storage area 276, the respective lower portions of slide surfaces 270, 272, 274 may begin to be impeded by the accumulated parcels or packages. In such an event, parcels or packages will continue to collect along the respective surfaces 270, 272, 274 until they are removed from the storage area 276. By so distributing the parcels and packages evenly throughout the storage area 276, the passive parcel or package distribution device 264 utilizes space within the storage area 276 more efficiently than heretofore thought possible.

As perhaps best shown in FIG. 8, storage area 276 is accessed via a door 278. Door 278 is preferably secured by a combination or code type lock, which can be opened by authorized personnel or representatives of a commercial delivery service. System 210 also includes a manifest printer 280, which is mounted on a pedestal within a corner of storage area 276 which is distal from the upper end 268 of ramp 266. Manifest printer 280 performs the same function as the manifest printer described with reference to the embodiment of FIGS. 1–6.

According to one important aspect of the invention, system 210 is provided with a climate control unit 282 which is in communication with the outside air through the ventilation opening 232. Climate control unit 282 is preferably a combined fan and heater unit. In warm weather, climate control 282 simply circulates outside air through the storage area 276 to keep heat and humidity within the storage area 276 to a minimum. When outside temperatures fall beneath a predetermined level, the heater element within climate control unit 282 is actuated, thus heating the storage area 276 to a predetermined minimum temperature. Preferably, outer housing 212 is fabricated from an insulating material. Most preferably outer housing 212 is fabricated from a metallic inner wall, a metallic outer wall and insulative material between the inner and outer walls.

Alternatively, climate control unit 282 may further incorporate an air conditioner unit for keeping the temperature within storage area 276 at a pre-determined temperature and humidity which is less than the temperature and humidity of the outside air. This is preferably accomplished by incorporating a heat pump into climate control unit 282, which can provide heating of the storage area 276 during cold periods, and cooling of the storage area 276 during warmer, more humid periods. Climate control unit 282, in conjunction with the hooded overhang 220, makes system 210 convenient and safe to use in outdoor, unsheltered application sites.

The operation of system 210 is identical to that described above with reference to the first embodiment of the invention, except as described otherwise below.

Figure 10:
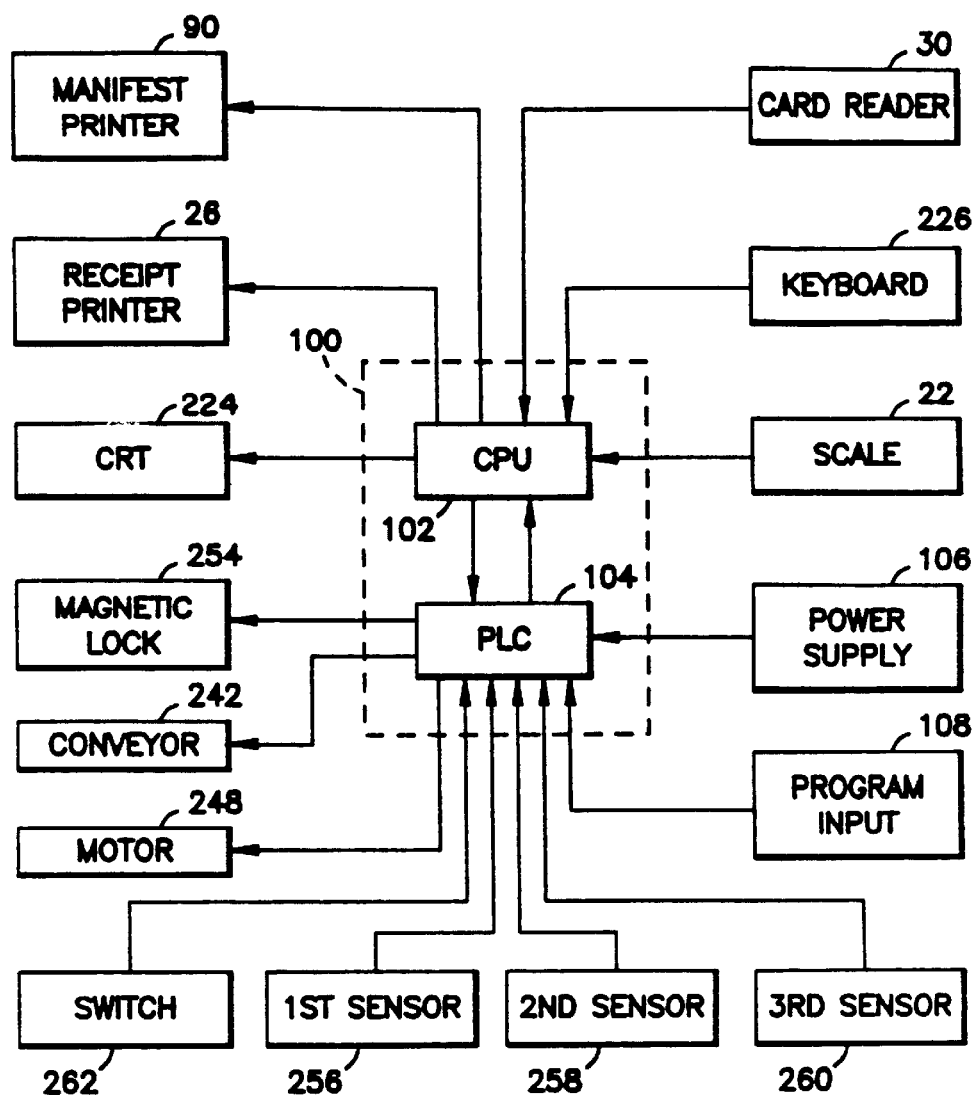
FIG. 10 is a schematic view of a control system for the apparatus illustrated in FIGS. 7–9.

First, a customer approaches the customer interface area 218, and lays whatever personal effects he or she may have upon the platform which is adjacent to scale 222. The customer then measures the dimensions of the item being shipped on the indicia 228 which is provided adjacent to the platform. In response to inquiries made to the CRT 224, the customer enters complete addressing information through the keyboard 226. After an inquiry procedure which is identical to that described above with reference to the first embodiment of the invention, a printer (not shown) prints out an address label containing the address information input by the customer. The customer then applies the label to the parcel or package. Once this process is complete, the PLC 104, schematically depicted in FIG. 10, deactivates magnetic lock 254. FIG. 10 illustrates the control system 100' for the embodiment of FIGS. 7–9. The customer is then instructed on the CRT 224 to open the outer sliding door 234. The customer then slides the outer door 234 to the left and places the parcel, package or letter on the upper run of the conveyor belt 244. When sliding door 234 is sufficiently open, switch 262 is actuated, and the CRT screen is modified to instruct the customer to again close the sliding door 234. When the customer closes the sliding door 243, switch 262 is again actuated, causing the PLC 104 to activate the conveyer 242 for a pre-determined length of time.

If the customer is mailing a thin letter, first photocell sensor 256 will not detect that letter, since the first photocell sensor 256 is mounted a pre-determined distance above the plane in which the upper run of the conveyer belt 244 is positioned. In that case, the letter travels on conveyer belt 244 and is propelled beneath the lower surface of the inner door 246 directly onto the ramp 266. At this point, the letter will be detected by the third photocell 260, and the PLC will reactivate magnetic lock 254. Alternatively, the second photocell sensor 258 can be positioned to detect a letter at this point, in addition to its package detection capabilities. In this case, the third photocell sensor 260 is not necessary. The letter will then travel down one of the slide surfaces 270, 272, 274 of ramp 266, depending upon the size and center of mass of the envelope, and the lateral positioning of that envelope upon the conveyer belt 244 by the customer.

If it is a parcel or package being posted by the customer, that parcel or package will be detected by the first photocell sensor 256 as it travels toward the storage area 276 within the temporary holding space 240 on conveyer belt 244. Once PLC 104 learns that first photocell sensor 256 has been actuated, PLC 104 instructs stepper motor 248 to open inner door 246. At this point, PLC 104 also reactivates magnetic lock 254. As the parcel or package advances, it will also be detected by second photocell sensor 258. During the period of detection, no action is taken. When the parcel or package advances to the extent that it no longer activates the second photocell sensor 258, PLC 104 instructs stepper motor 248 to close the inner door 246. As the parcel or package moves forward at this point, it may contact the surface of the inner door 246, and be deflected somewhat to the left as viewed in FIG. 8. At this point, the parcel or package will be directed down one of the different slide surfaces 270, 272, 274 of the ramp 266. The redirecting effect created by the inner door 246, in conjunction with the divergent slide surfaces, tend to evenly distribute parcels and packages within the storage space.

Embodiment of FIGS. 11–19

Figure 11:
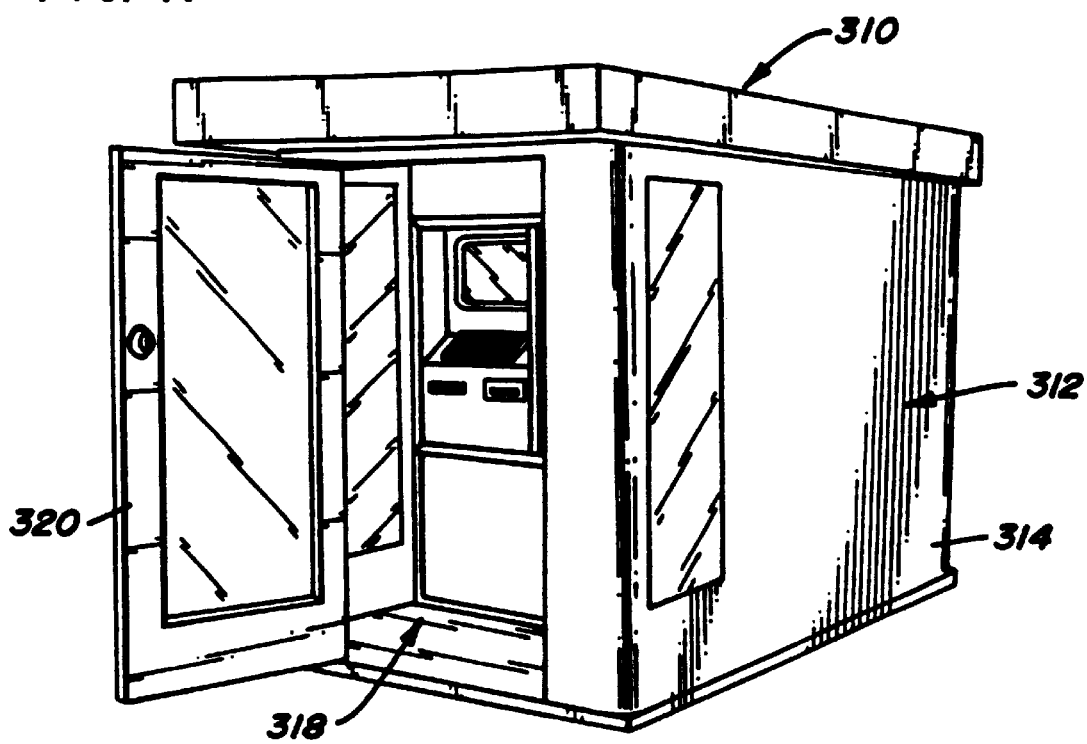
FIG. 11 is a perspective view of an apparatus constructed in accordance with a third embodiment of the invention.

FIGS. 11–19 illustrate an improved system 310 for accepting and storing parcels and packages for subsequent pick-up by a commercial carrier which is constructed in accordance with a third embodiment of the invention. As shown in FIG. 11, system 310 includes an outer housing 312 having an outer surface 314, an inner surface 316 (FIG. 13), and an enclosed customer interface area 318 that can be accessed by a customer by means of a door 320.

Figure 12:
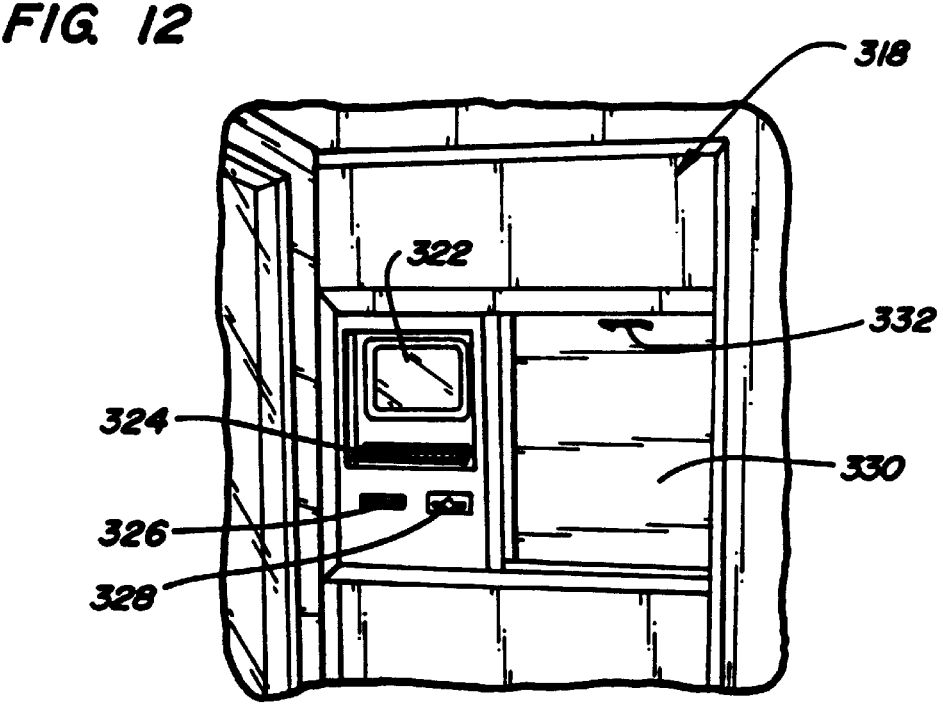
FIG. 12 is an enlarged front elevational view of a customer interface area in the apparatus depicted in FIG. 11.
Figure 17:
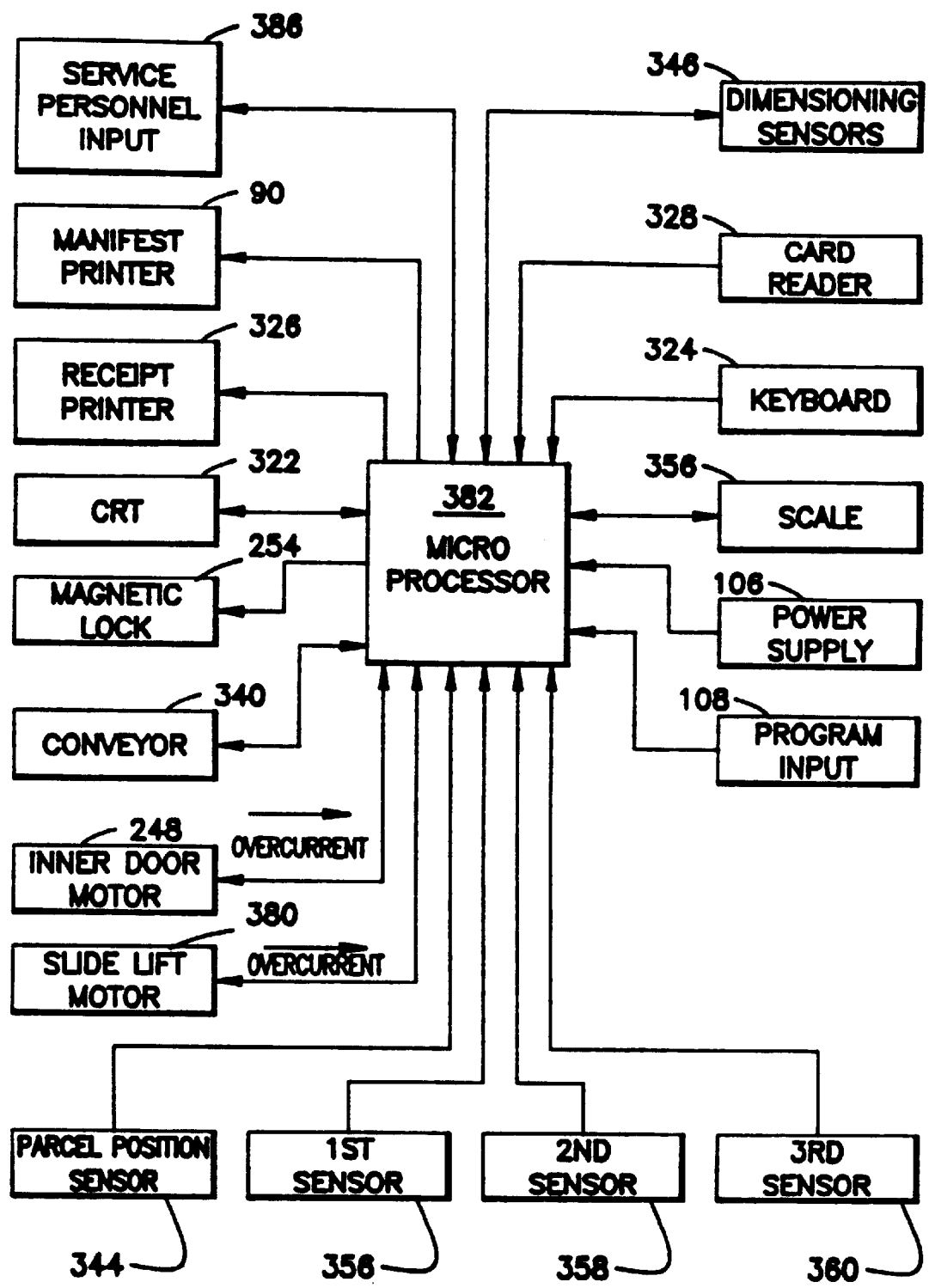
FIG. 17 is a schematic view of a control system for the apparatus illustrated in FIGS. 11–16.

FIG. 12 is a closer view of the customer interface area 318. Customer interface area 318 includes a display device such as a CRT 322, a keyboard 324, a label printer 326, and a credit card reader 328. Customer interface area 318 further includes an outer door 330 with a handle 332 adapted for gripping by a customer to provide selective access to an intermediate holding space 334 for holding the package before the customer relinquishes control of it. As shown in FIG. 17, a magnetic lock 254 is provided for locking the outer door 330 in a closed position, as was the case in the previously described embodiments.

Figure 13:
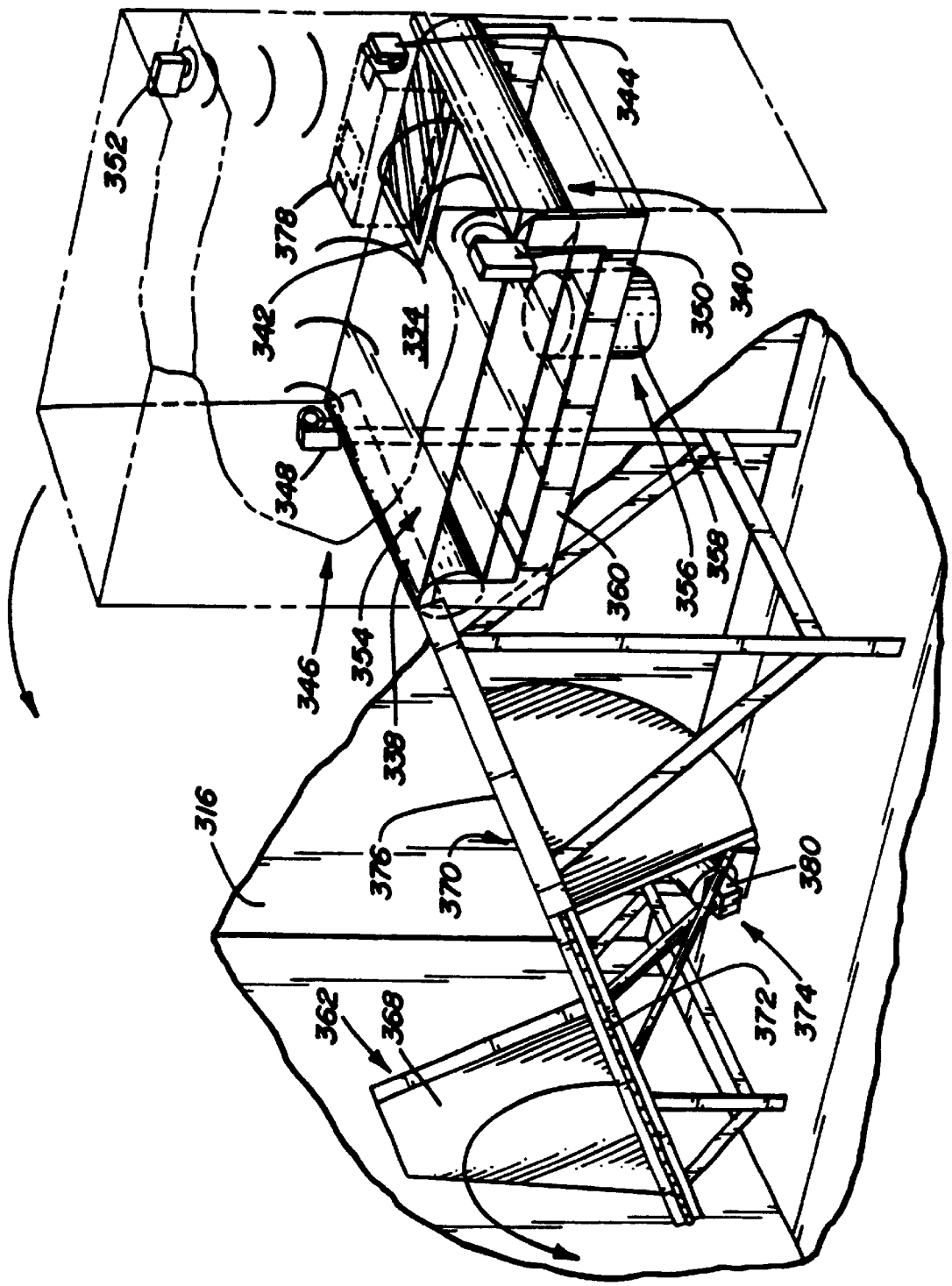
FIG. 13 is a perspective diagrammatical view of certain components of the apparatus depicted in FIGS. 11 and 12.
Figure 14:
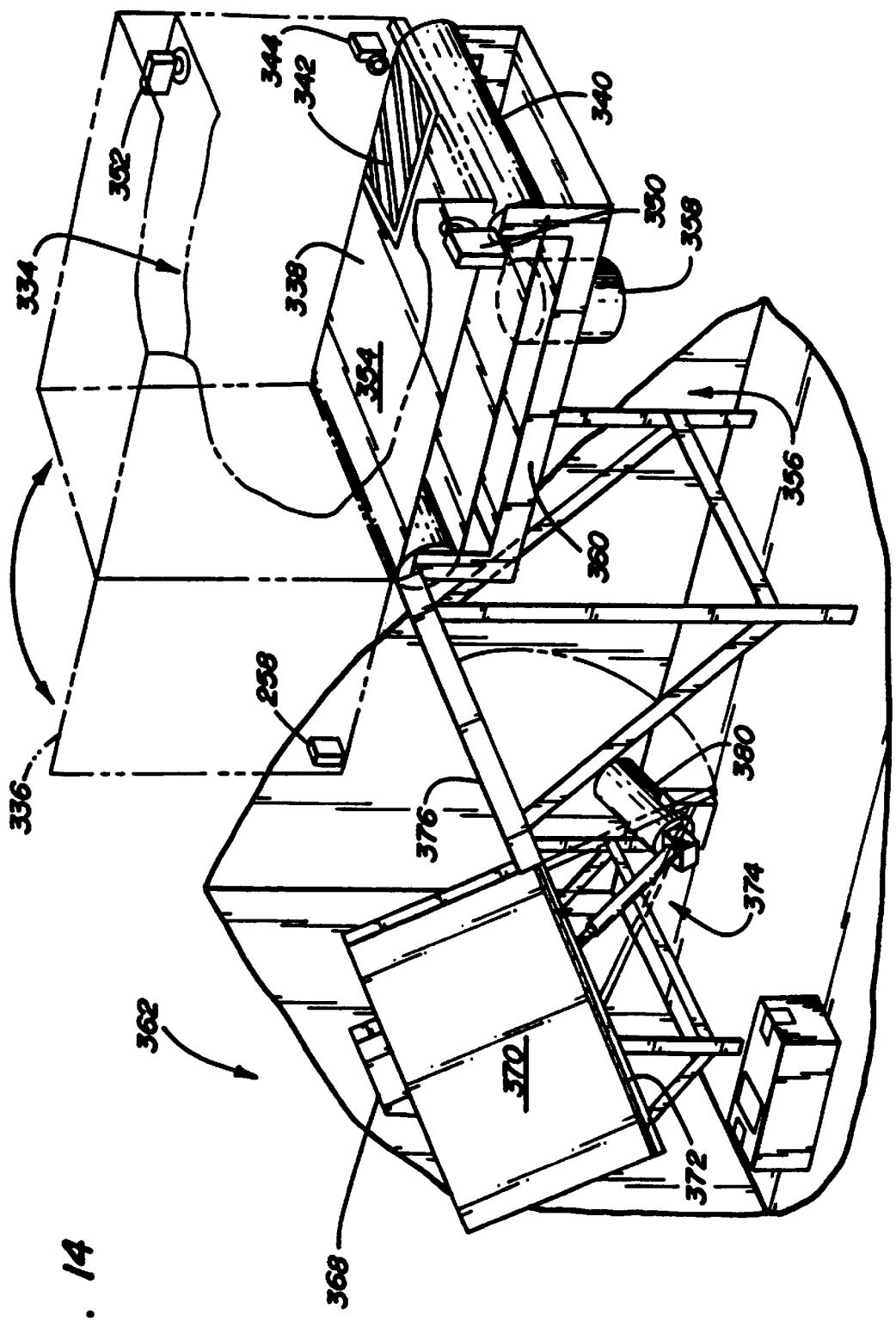
FIG. 14 is a perspective diagrammatical view of the components shown in FIG. 13 but shown in a second operative position.

FIGS. 13 and 14 better illustrate the intermediate holding space 334. As shown, intermediate holding space 334 is partially defined by outer door 330, an inner door 336, and by an upper run 338 of an underlying conveyer belt 340. Upper run 338 defines a support surface 354 on which a parcel, package or letter and the like may be placed by a customer. Preferably, upper run 338 of conveyer belt 340 has markings 342 thereon that indicate to a customer that a parcel, package or letter 378 is to be placed at a predetermined position on the support surface 354, such as the forward right hand corner of the intermediate holding space 334. The operation of conveyer belt 340 is controlled in response to instructions from a microprocessor 382, as will be described in greater detail below. A photocell sensor 344 is preferably provided adjacent to the forward right hand corner of the intermediate holding space 334 to verify that a customer has placed the parcel, package or letter 378 in the proper position.

As also illustrated in FIGS. 13 and 14, system 310 further includes a novel dimensioning 346 system for measuring the dimensions of the parcel, package or letter 378 when it is positioned on the markings 342 in the intermediate holding space 334. Dimensioning system 346 includes a sensor 348, which is positioned in the rear of the intermediate holding space 334, preferably on inner door 336, a sensor 350, which is preferably positioned on the forward left side of the intermediate holding space 334, and a sensor 352, which is preferably positioned in the upper right hand corner of the intermediate holding space 334.

As shown in FIGS. 13 and 14, sensors 348, 350 and 352 may be ultrasonic distance transducers for measuring the length, width, and height of the parcel, package or letter 378. In operation, the transducers 348, 350 and 352 emit sound waves that bounce off of the parcel, package or letter 378. The echoed sound waves are then detected by the respective transducers 348, 350, and 352, and the time difference between the emission and receipt of the sound wave is calculated. The time difference value is then divided by the speed of sound and converted to a voltage representative of the distance of the parcel, package or letter 378 from the respective transducer. This calculation is performed about once every second using the apparatus illustrated in more detail below in FIG. 17.

Figure 15A:
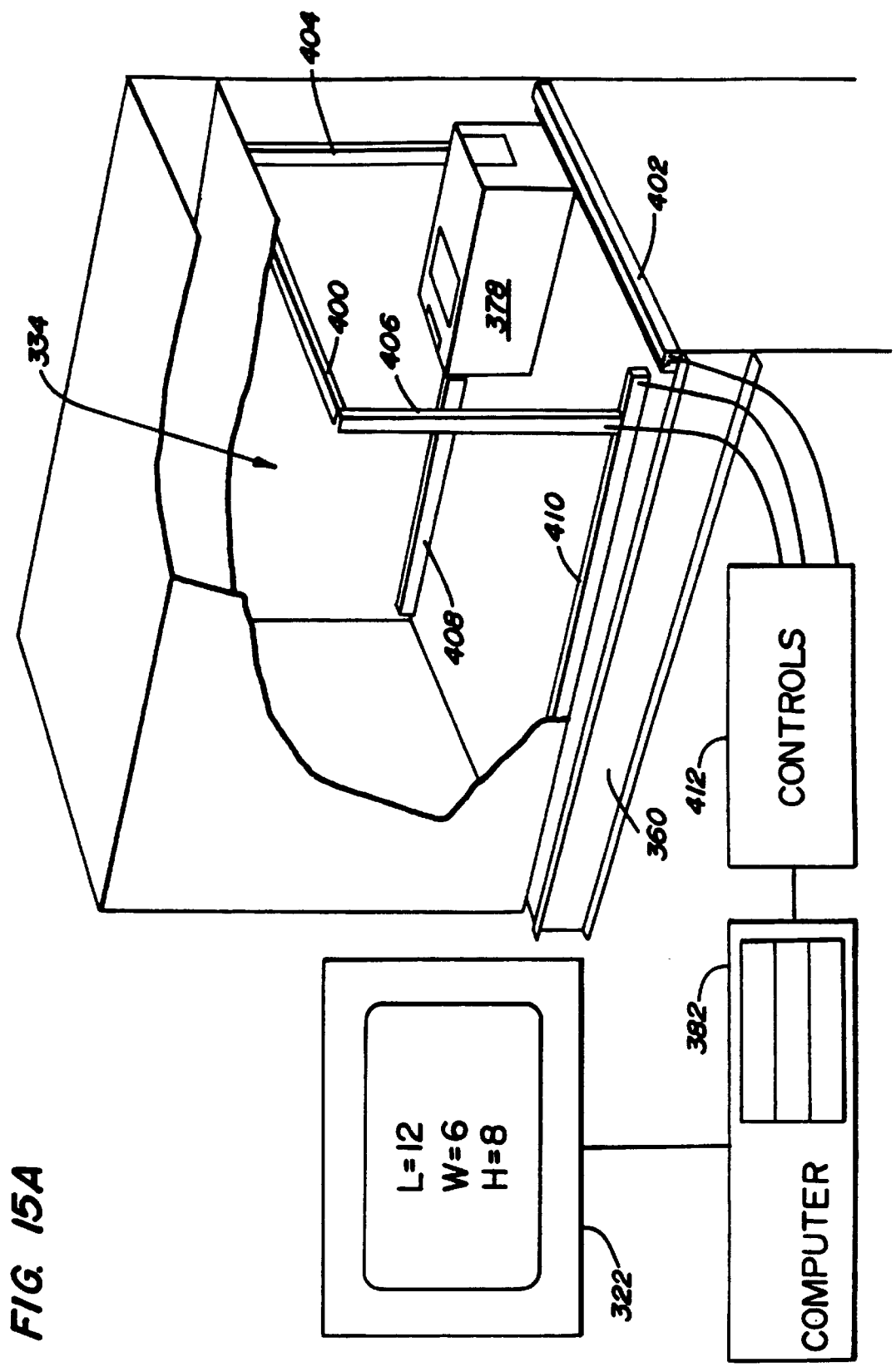
FIGS. 15A–15D illustrate alternative embodiments of the dimensioning system of the apparatus of FIGS. 11–14.

FIGS. 15A–15D illustrate alternative embodiments for the dimensioning system 346. For example, transducers 348, 350 and 352 of FIGS. 13 and 14 may be replaced by respective light curtain sensors 400, 402, 404, 406, 408, and 410 as shown in FIG. 15A. As shown in FIG. 15A, light curtain sensors 400 and 402 measure the width of parcel, package or letter 378, light curtain sensors 404 and 406 measure the height of parcel 378, and light curtain sensors 408 and 410 measure the length of parcel 378. However, in a retroflective system the receive sensors 402, 406 and 410 may be replaced by a mirror and the transmit sensors 400, 404, and 408 replaced by a light transducer. As shown in FIG. 15A, the light curtain sensors 400–410 communicate with a microprocessor 382 via a control device 412 which, for example, converts the analog voltage readings from the sensors 402, 406, and 410 into digital signals for processing by microprocessor 382. During operation, the opposed sensor pairs generate a "curtain" of precisely synchronized infrared light beams. When the parcel or letter 378 is placed in proper alignment on markings 342 of the support surface 354, certain of the light beams are blocked. An appropriate analog or digital value is then transmitted to microprocessor 382 via control device 412. The calculated dimensions are then displayed to the customer on display device 322. This measurement information is sent from each sensor approximately once every millisecond.

Figure 15B:
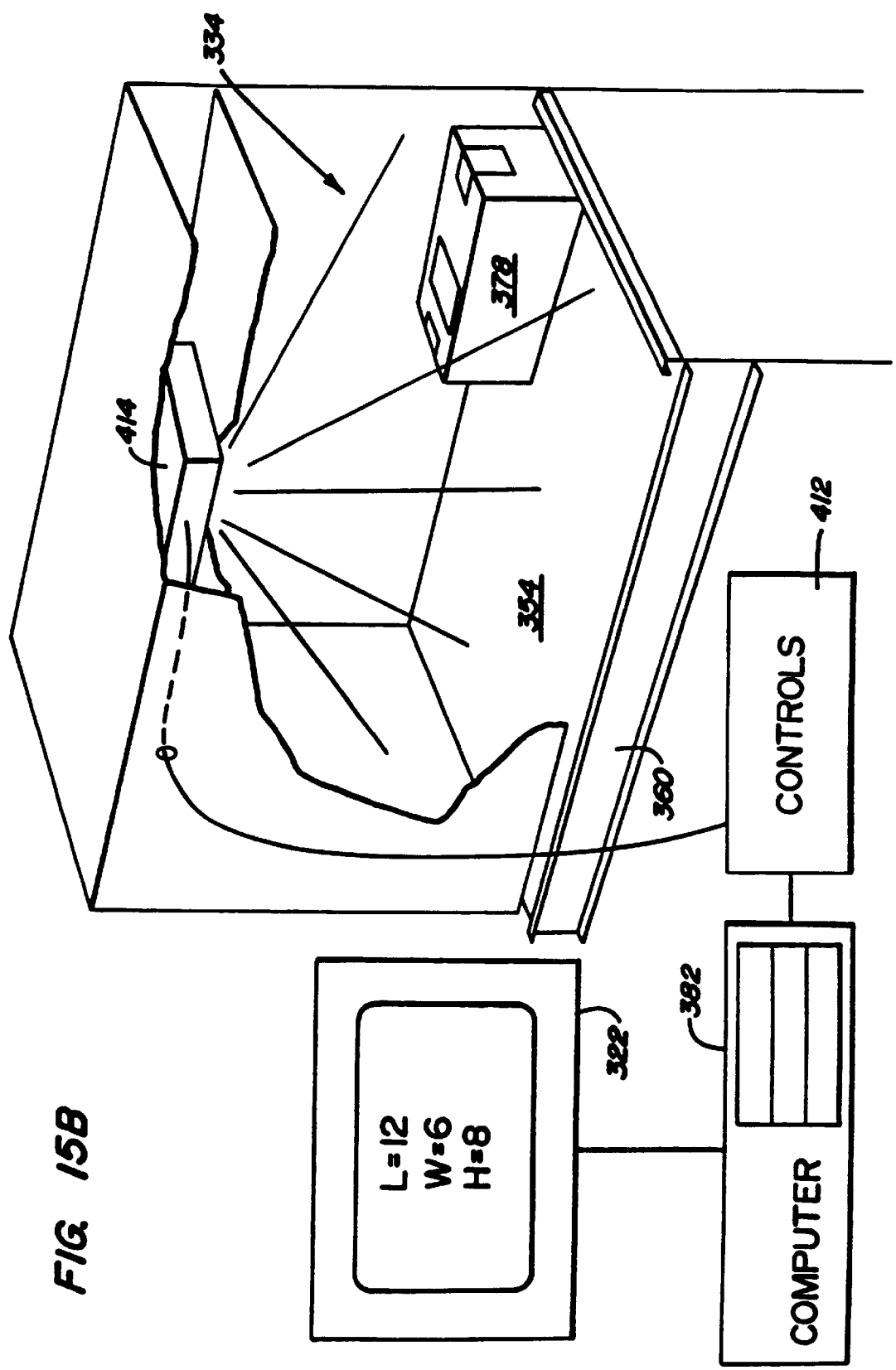
Figure 15C:
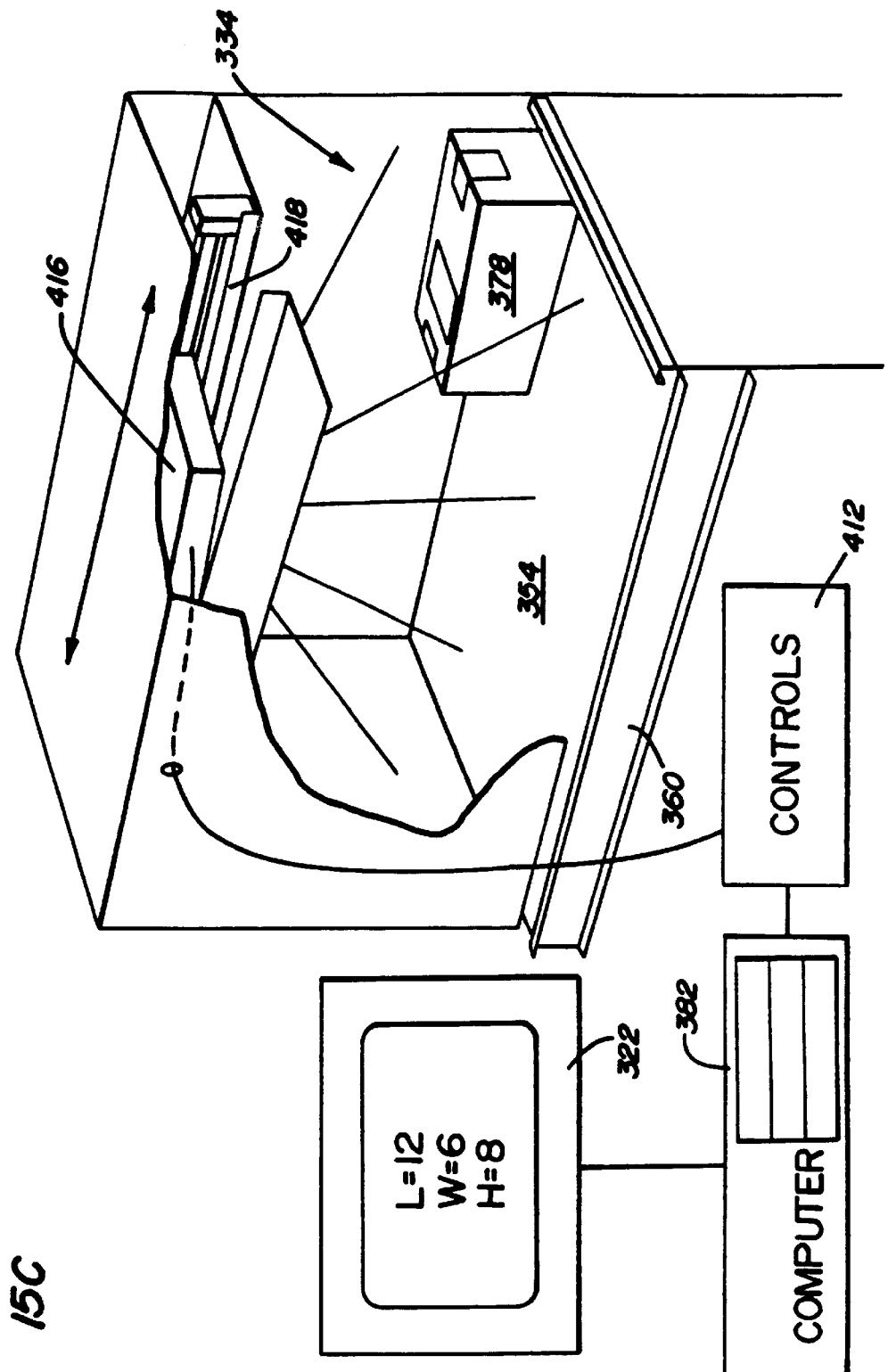

As shown in FIG. 15B, a holographic measuring system also may be used to measure the dimensions of parcel or letter 378. The holographic measuring system of FIG. 15B includes a holographic scanner 414 having one or more internal mirrors for reflecting light to parcel or letter 378 for detecting the package dimensions. In addition, the holographic scanner 414 may also detect a bar coded label on the parcel or letter 378. As known by those skilled in the art, mirrors within holographic scanner 414 are moved to permit the holographic scanner 414 to "see" all sides of the parcel or letter 378. Holographic scanner 414 communicates the detected measurements to microprocessor 382 via control device 412 which, for example, converts the analog dimensions into digital signals for processing by microprocessor 382. During operation, the holographic scanner 414 scans the parcel or letter 378 and generates dimension data from the echoed light rays in accordance with techniques known by those skilled in the art. The resulting dimensions are then displayed to the customer on display device 322 under control of microprocessor 382. Alternatively, holographic scanner 414 may not include internal mirrors and instead include an active scan mechanism as shown in FIG. 15C. In other words, as shown in FIG. 15C, the holographic scanner 414 of FIG. 15B may be replaced by an active scan device 416 which is moved along a track 418 to scan the parcel or letter 378. This embodiment otherwise works in the same manner as the embodiment of FIG. 15B.

Figure 15D:
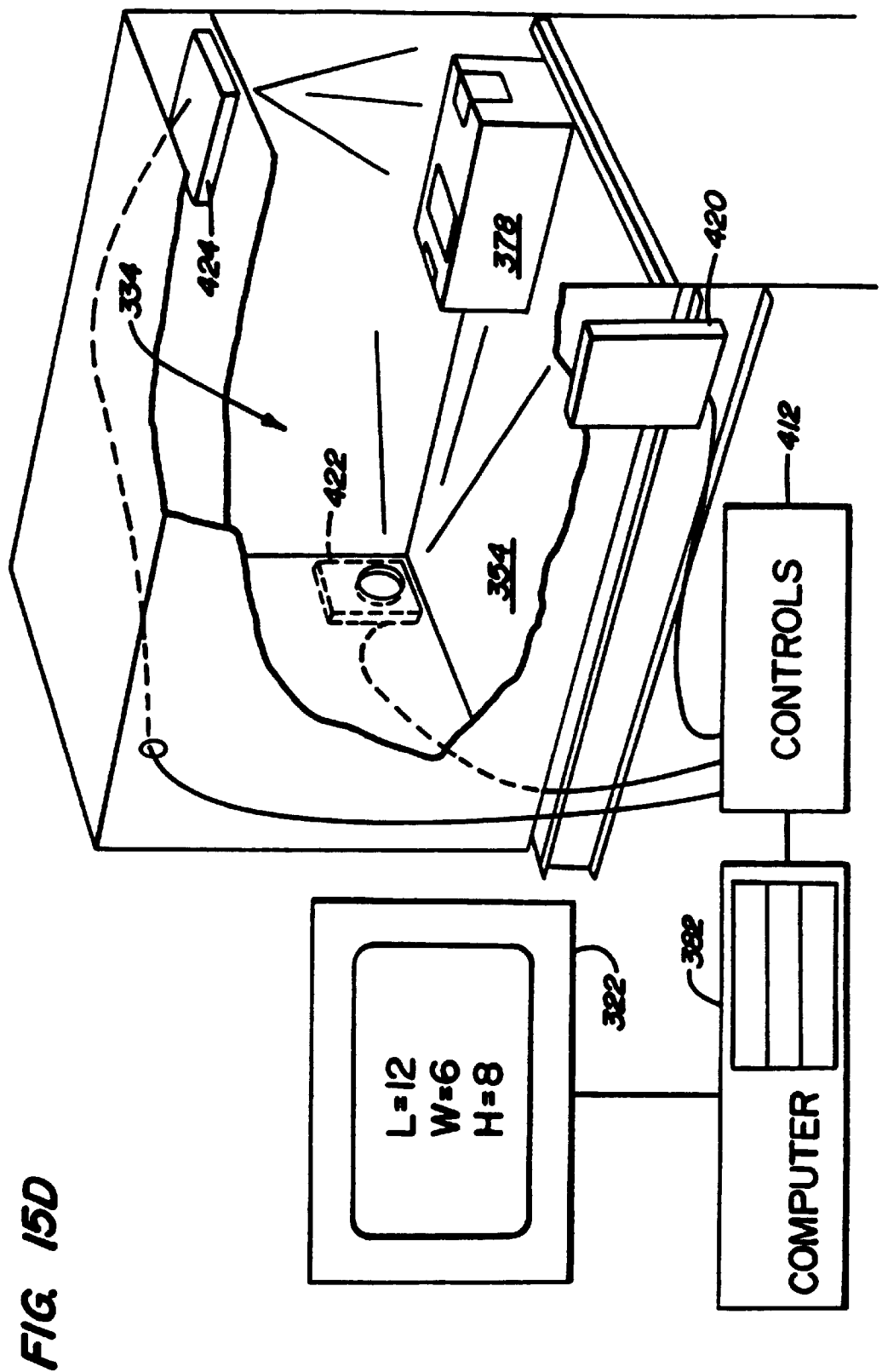
Figure 16:
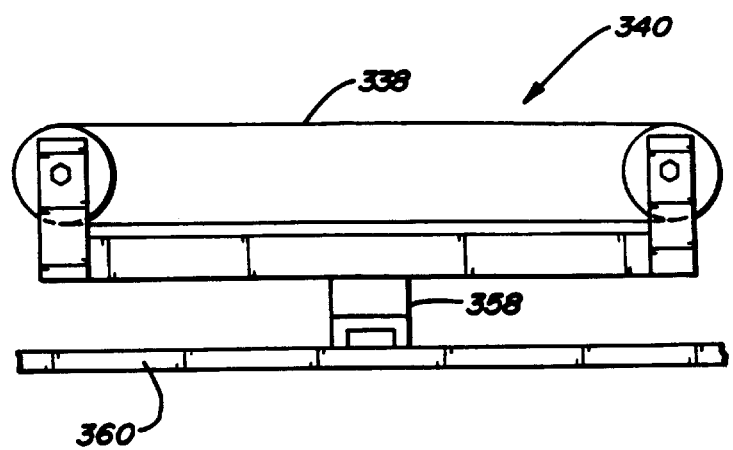
FIG. 16 is an isolated diagrammatical view of the weighing and conveying mechanism of the apparatus depicted in FIGS. 11–15.

As shown in FIG. 15D, a laser measuring system may also be used to measure the dimensions of parcel or letter 378. The laser measuring system of FIG. 15D includes laser transducers 420, 422, and 424 which provide continuous voltage readings to control device 412. Microprocessor 382 determines the parcel's measurements from the angle of the emitted light received at the receiver. Mirrors may also be used for directing the light as desired. Transducers 420, 422 and 424 communicate the detected measurements to microprocessor 382 via control device 412 which, for example, converts the analog dimensions into digital signals for processing by microprocessor 382. The calculated dimensions are then displayed to the customer on display device 322 under control of microprocessor 382.

As shown in FIGS. 13 and 14, system 310 further includes a weighing system 356 that is capable of weighing the parcel 378 while the parcel 378 is positioned in the intermediate holding space 334. Weighing system 356 preferably includes one or more load cells 358, which are positioned to measure the entire weight of the conveyer belt 340 and its associated structural support 360. This is illustrated schematically in FIG. 16. The load cells 358 provide input to microprocessor 382. By comparing the weight of the entire conveyer assembly 340 without and with the package 378 thereon, the weight of the parcel 378 can be accurately determined using such load cells 358.

Another advantageous feature of system 310 shown in FIGS. 13 and 14 is the provision of a stacking system 362 for stacking the parcel 378 in the storage area that is provided at the rear of the unit. Stacking system 362 preferably includes a slide 376 for permitting the parcel 378 to slide from the intermediate holding space 334 onto a platform 370. As shown in FIG. 14, platform 370 is mounted to pivot about a hinge 372 in a plane that is substantially perpendicular to the plane of slide 376. A drive mechanism 374 that includes a step motor 380 is responsive to instructions from the microprocessor 382 to control rotation of the platform 370 about the hinge 372. A stop surface 368 is provided to stop the parcel 378 from =sliding past the platform 370. During operation, platform 370 is rotated about hinge 372 by step motor 380 for stacking of the parcel 378 on the floor of the storage area as shown in FIG. 14. Preferably, step motor 380 includes an overcurrent detector so that platform will not attempt to rotate if it is blocked by another parcel, as when the storage area is full.

FIG. 17 illustrates the control system for the embodiment of FIGS. 11–16. As with the previous embodiments, the control system illustrated in FIG. 17 coordinates the various sensors, motors, and input/output devices throughout the system. As schematically illustrated in FIG. 17, the control system includes a microprocessor 382 which receives input from the various components of the system 310 and provides the appropriate control outputs. Operation of the system 310 is preferably controlled by software implemented by microprocessor 382 as will be described in more detail below with respect to FIGS. 18 and 19.

As with the previous embodiments, inputs to microprocessor 382 include the magnetic card reader 328, the keyboard 324, and the electronic scale 356. Other inputs include a power supply 106 which provides power to the microprocessor 382 and the various electrical components of the system 310 of the invention as well as a program input device 108 which is preferably a keyboard provided in a panel behind the customer interface area 318. Program input device 108 allows the software of microprocessor 382 to be accessed for updating by service personnel. Microprocessor 382 preferably contains sufficient memory (ROM and/or RAM) for receiving the data input from the program input device 108. Other inputs to microprocessor 382 include first, second and third sensors 356, 358 and 360, respectively, which correspond to sensors 256, 258 and 260 of the embodiment of FIGS. 7–10. Parcel position sensor or photo eye 344 provides and input to microprocessor 382 indicating whether the parcel or letter 378 to be shipped is placed properly on the markings 342 of the conveyer belt 340. Outputs from microprocessor 382 include manifest printer 90, receipt printer 326 and CRT 322, which in a preferred embodiment includes a touch screen display which also enables the customer to input information into microprocessor 382. Thus, CRT 322 is used in conjunction with keyboard 324 to provide the necessary input from a customer to microprocessor 382.

In the embodiment of FIGS. 11–16, microprocessor 382 also sends activation signals to and receives outputs from dimensioning sensors 346 representing the dimensions of the object to be mailed. Microprocessor 382 also activates and receives overcurrent signals from inner door motor 248 and slide lift motor 380 indicating that movement of the inner door or slide lift, respectively, is blocked in some manner and that power to the motors should be shut off. The magnetic lock 254 on the outer door 330 is also controlled by microprocessor 382 during operation as will be described below with respect to FIGS. 18A and 18B. In addition, conveyor 340 is activated by microprocessor 382 and also outputs a signal indicating that it is reset and ready for the next package. Finally, service personnel may also provide input via a service personnel input device 386 such as a keyboard or keypad behind the customer interface area 318 in the storage area. Input device 386 allows service personnel to accept or reject packages found in the storage area. In addition, microprocessor 382 may provide information to the service personnel upon receipt of certain codes via the input device 386. For example, microprocessor 382 may provide the manifest information directly into the service personnel's DIAD board so that all the shipping information may be taken away in electronic form for further processing.

Figure 18A:
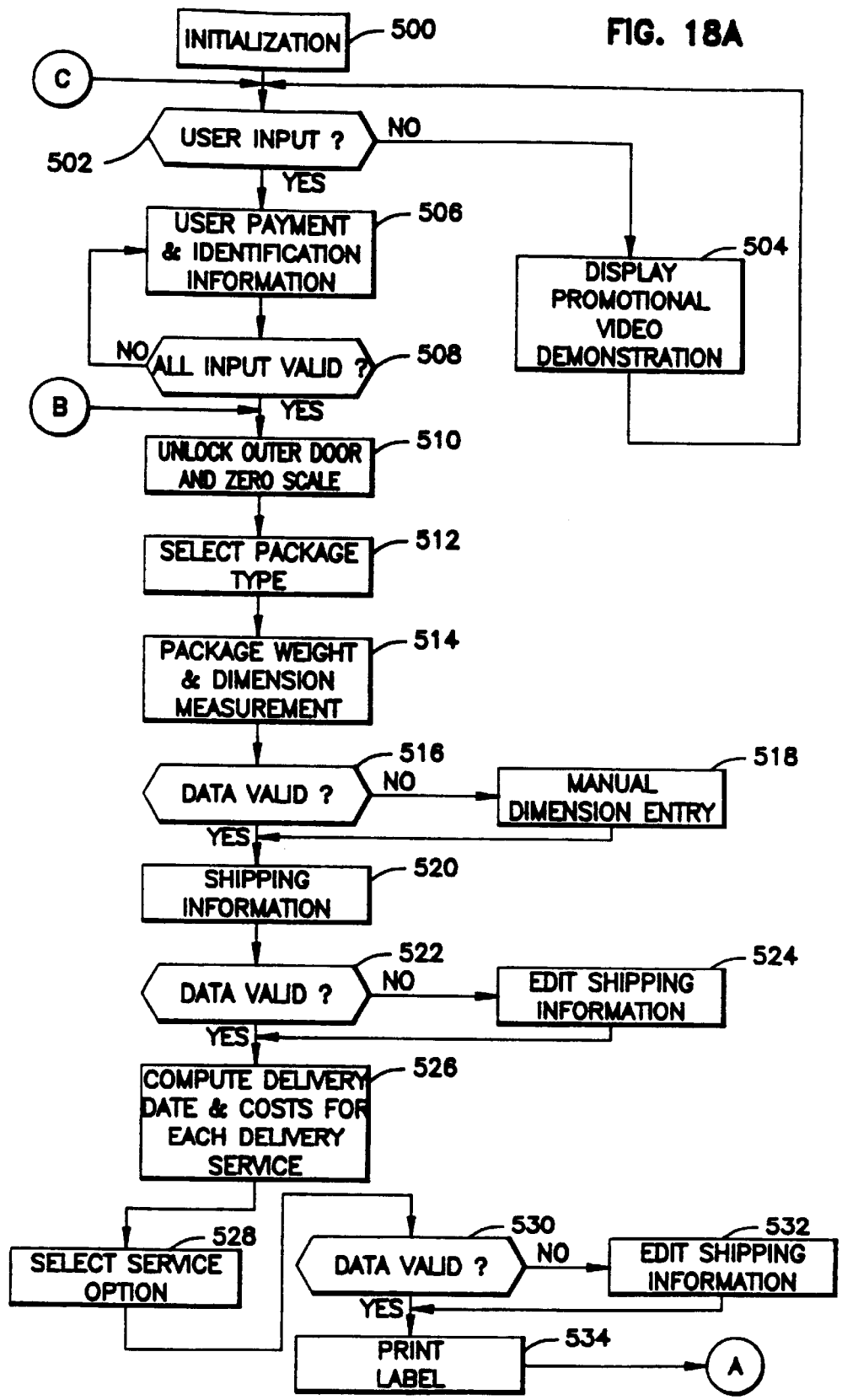

A description of the software which is operated upon by microprocessor 382 as well as description of the operation of the third embodiment of the invention will now be described in detail with reference to FIGS. 18A and 18B.

As in the previous embodiments, system 310 of the third embodiment is deployed to a location which is considered convenient to potential customers. Once the system 310 is positioned, the microprocessor 382 is programmed to interface with potential customers by providing the necessary programming input via the program input device 108. In a preferred embodiment, the programming software is written in an event driven language such as LABVIEW™ available from National Instruments Corp. Such event driven software provides a graphical data flow which facilitates the design and troubleshooting of the software. Typically, the loaded information includes the appropriate zone and weight charges for all client delivery services as well as the delivery services available from the licensed commercial delivery service providers. The programmer also loads the corresponding fee files which correspond to each client delivery service available at that location. Once all such information has been loaded into microprocessor 382, system 310 is ready to interact with potential customers.

To begin a shipping transaction, a customer approaches the system 310 and enters the customer interface area 318 via door 320. The customer then touches the appropriate portion of the touch screen of CRT 322 to initiate operation of the system 310. The system software then guides the customer through the shipping transaction as follows.

Upon initialization of system 310 at step 500, it is determined at step 502 whether the customer has initiated a shipping operation by touching the touch screen of CRT 322. If not, a promotional video demonstration is displayed on the CRT 322 at step 504. This promotional video demonstration may include a short demonstration (30–45 seconds) of operation of the system 310 as well as customer instructions, a definition of services, a schedule of pick-up times and the like. This promotional video demonstration repeats constantly until input from the customer is detected at step 502. Upon initiation of a shipping operation at step 502, the customer is instructed at step 506 to insert his or her credit card into the magnetic card reader 328 to provide the necessary payment and identification information. A credit card check is then initiated. Alternatively, a personal debit card provided to the customer may also be read by magnetic card reader 328 for this purpose.

The name of the customer is preferably taken from the customer's credit card or personal debit card to personalize the interaction. If the card is validated, a prompt is displayed on CRT 322 which asks the customer for a phone number where the customer can normally be reached. After the customer enters the phone number through keyboard 324, the number is evaluated to determine whether it meets predetermined criteria, such as whether the number is either 7 or 10 digits. If it does not, a second prompt is displayed on the CRT 322 which asks the customer to re-enter the number. Of course, the customer's return address may also be requested. However, "smart" debit cards may be used which include the customer's return address on the magnetic strip, or alternatively, such information may be stored in a database and written to the customer's personal debit card. In accordance with the invention, when a credit card is used and no return address is obtained from the customer, the delivery service carrier or the operator of the system 310 would take responsibility for any packages or letters not properly mailed. However, by providing a mechanism for accepting the return address from the customer and/or reading the return address off of the customer's personal debit card, the shipper's liability for dealing with improperly mailed packages may be minimized.

If the information provided by the customer in step 506 is determined to be valid at step 508 (and the credit is validated), the transaction is permitted to proceed. If not, a prompt is displayed on CRT 322 instructing the customer to pass his or her credit card or personal debit card through the card reader 328 a second time. Once the card is validated, the customer is again asked for his or her telephone number. Once the transaction is permitted to proceed, the magnetic log 254 is opened to unlock the outer door 330 at step 510. Scale 356 is also zeroed and prepared for weighing the parcel or envelope 378 to be shipped.

At this point, the customer is instructed to place the parcel or envelope onto markings 342 in the intermediate holding space 334. The customer is also instructed to push the parcel or envelope 378 so that it abuts against the sides of the intermediate holding space 334 at the upper right hand corner of the intermediate holding space 334 adjacent markings 342. Once photo cell sensor 344 detects the presence of the parcel or envelope 378, the customer is instructed at step 512 to select a package type. For example, package types include a letter, a pak or a package or any other package type which may be accepted by the delivery service. Once the customer selects the package type at step 512, the parcel or letter is weighed by scale 356 and its dimensions are repeatedly taken by dimensioning sensors 346 at step 514. If it is determined that the package, parcel or envelope exceeds a predetermined weight maximum, which is preferably approximately 70 lbs., a message is displayed on the CRT 322 to the effect that system 310 cannot accept packages which exceed the predetermined weight limit. Similarly, if the package is oversized, either it will not fit through the outer door 330, or the dimension data will cause an appropriate message to be sent to the customer. Preferably, several weight and dimensioning measurements are taken at step 514, the high, low and extreme values thrown out, and the measurements averaged to obtain a more accurate reading. It is then determined at step 516 whether the weight and dimensioning data is valid, and if not, the customer may be instructed to enter the dimension data manually at step 518. This may be accomplished by the customer by reading the dimensions off of a dimensioning grid (not shown) provided on the inside surface of the intermediate holding space 334. At this point, a density calculation may be performed for determining the density of the parcel to be shipped. The density information is useful to the delivery service when determining appropriate handling of the parcel for shipment.

Once the weight and dimensions of the package have been determined at steps 514 through 518, the customer is prompted to provide the necessary shipping information at step 520. For example, a screen is displayed which requests the customer to enter the zip code of the destination of the item to be mailed. In a preferred embodiment, an automatic zip code check routine is invoked for automatically providing the destination city and state from the zip code information by searching a data base of zip codes. This routine saves the customer from having to enter the city and state information. The customer is next asked whether the recipient's shipping address is a commercial or residential location and then asked to input the destination name and destination street address for the item to be shipped. The zip code and other destination information is preferably inputted into the system via the keyboard 324, although the information may also be provided via the touch screen of CRT 322. The zip code and other information may be evaluated against certain criteria such as whether a 5 digit zip code has been entered. If such criteria are not met, a screen is displayed to the customer which instructs the customer to re-enter the zip code or other information. If the criteria are met, a screen is displayed on CRT 322 instructing the customer to enter the value of the item that is being shipped. The customer then enters the value of the item through keyboard 324 or the touch screen of CRT 322. This information is evaluated to determine whether the declared value exceeds a predetermined maximum. If the pre-determined maximum is exceeded, a screen is displayed on CRT 322 instructing the customer to re-enter the valuation information. This process is repeated until the destination name, street address, value and contents are properly entered. At the customer's request, the software of the invention may also automatically insure the package up to a predetermined maximum. All of this data is then checked at step 522 to determine whether it is valid, and, if not, the customer is given an opportunity at step 524 to edit the shipping information as desired.

Once all of the shipping information has been properly entered, the delivery date and cost for each delivery service available to the customer is computed at step 526. In computing the delivery date, the software takes into account weekends, holidays and other days in which no delivery service is available when calculating for each service when the package can be expected to be delivered. The cost for each available delivery service is also calculated using the weight and dimensioning information as well as the destination data. The delivery date and cost for all available service options are then displayed to the customer on the CRT 322. This allows the customer to make an informed judgment regarding which delivery service is desired on the basis of cost and projected delivery date. The customer may also be given an opportunity to select weekend delivery, as available. The customer then selects the desired service option at 528. For example, the customer may select second day air for Saturday delivery. All data regarding the customer's selection is then displayed to the customer on CRT 322 so that the customer can determine at step 530 whether all of the proper information has been provided. If so, the label is printed at step 534. If not, the customer is given an opportunity at step 532 to edit this information before the label is printed at step 534.

In a preferred embodiment, the system 310 may automatically provide, or the customer may elect to provide, tracking information on the label of the parcel or envelope being shipped. This is accomplished by printing a bar code on the label in addition to the destination information. This tracking bar code enables the carrier service to keep track of that package or envelope using that bar code in accordance with known techniques. On the other hand, the tracking bar code label also may be used to validate receipt of the proper package in the intermediate holding space 334 using a holographic scanner as described above.

Once all of the label information has been verified by the customer, the label is printed and applied to the parcel or envelope by the customer. The customer is then instructed to reposition the parcel or envelope on markings 342 of the conveyor belt 340 (if the package was removed to apply the label) and to close the outer door 330. At this point, a very important validation step is performed. In particular, the system 310 determines at step 536 whether it has received the correct package. This step is critical since it verifies that the customer did not perform a package switch or forget to replace the package in the intermediate storage area 334 for shipment. Such validation may be accomplished in several different ways in accordance with the invention. For example, in a simple embodiment, photo cell sensor 344 may simply detect whether any package has been placed on the conveyor belt 340. If so, it is presumed that the package on the conveyor belt 340 is the appropriate package with the appropriate label. On the other hand, in accordance with a preferred embodiment of the invention, the package is automatically reweighed and/or redimensioned once the customer has closed the outer door 330 (and hence the parcel or envelope cannot be accessed by the customer). If the reweighing and redimensioning results in approximately the same readings as when the package was previously weighed and dimensioned, it is presumed that the package placed on the conveyor belt 340 is the same package for which the label was printed. If there is such a match, microprocessor 382 activates magnetic lock 254 at step 542 to lock the outer door 330 to prevent further access to the package by the customer. On the other hand, if the reweighed and redimensioned package is determined not to correspond to the original package for which the label was printed, magnetic lock 254 is deactivated and the outer door 330 will not be permitted to close. If it is determined at step 538 that the package is not the correct package, an error message is then sent to the customer at step 540 requesting the customer to place the proper package on the conveyor belt. The validation process is then repeated at step 536 a predetermined number of times before the transaction is aborted. Once the outer door is locked at step 542, the conveyor belt 340 is advanced at step 544 to move the parcel or envelope into the storage area.

Upon activation of the conveyor belt 340, the inner door motor 248 is also activated at step 546 to open the inner door to the storage area. However, if an overcurrent is detected at step 548 indicating that the storage area is full, an error message is sent to the customer at step 550 and an appropriate message sent to service personnel. If no overcurrent is detected at step 548, sensors 356, 358 and 360 detect movement of the package or envelope 378 through the inner door 336 until it is detected at step 552 that the package has passed through the inner door 336. However, if the parcel 378 does not pass through the inner door 336 within a predetermined amount of time, or if an overcurrent signal is received from the inner door motor 248 indicating that the inner door 336 is jammed for some reason, an error message is sent to the customer at step 554 and the transaction is aborted. As shown in FIG. 18B, in the event of such a failure, the appropriate message is sent to service personnel, and the customer will be issued a receipt indicating that the package has been accepted so that the customer may then terminate his or her transaction. If it is determined at step 552 that the package has passed through the inner door, the conveyor belt 340 is then reset at step 556 for the next package.

Once the inner door 336 is completely open, the parcel or envelope 378 slides down slide 376 to stacking system 362. After a sufficient time has passed for the parcel or letter 378 to slide to the stacking system 362, microprocessor 382 activates the slide lift motor 380 at step 558 to operate the stacking mechanism 362. However, if an overcurrent is detected at step 560 indicating that the storage area is full or that the stacking system 362 is jammed, an error message is sent to the customer at step 562 and an appropriate message sent to service personnel. However, if no overcurrent is detected, the inner door 336 is closed at step 564. However, if an overcurrent is detected at step 566 during closing of the inner door, it is determined that the inner door is jammed, and an error message is generated at step 568. Otherwise, the shipping transaction for the first parcel or envelope is complete and the customer is asked at step 570 whether he or she desires to ship another package. If so, control returns to step 510 and the above-described shipping process is repeated. Preferably, the shipping data from the first transaction repopulates the input fields in order to minimize the customer's input time (since more than one package is often sent to the same destination).

After completion of a transaction for shipping a package at step 570, the customer is given an option at step 572 to purchase shipping supplies. If the customer desires to purchase shipping supplies, the customer makes his or her selections and inputs his or her mailing address at step 574 so that these supplies may be shipped directly to the customer. Appropriate deductions are made from the customer's credit or debit card. A receipt is then printed at step 576 indicating the package(s) received by the system 310 and/or the mailing items selected by the customer. Thus, the receipt is only printed once the parcel or envelope is safely within the storage area. The shipping manifest is also updated. System diagnostics are then performed at step 578 as will be described in more detail below with respect to FIG. 19. Control then returns to step 502 where the system displays the promotional video demonstration and waits for further customer input.

The display to the customer preferably integrates voice prompting for guiding the customer through the transaction. The system 310 also preferably allows the customer to cancel a shipping transaction at any time or to request help as needed. Also, a time out mechanism is preferably provided to abort a transaction when an input has not been received in a predetermined amount of time. Thus, at any point in a shipping transaction prior to package acceptance, the shipping transaction may be aborted if the customer does not respond to a screen in a pre-determined amount of time.

As in the previous embodiments, the system 310 also provides a master control screen for use by maintenance personnel during servicing of the system 310. To cause the system to display the master control screen on CRT 322, a maintenance person must enter a predetermined password into the keyboard 324. Once the password has been verified, the microprocessor 382 will display a screen on CRT 322 which presents the service person with at least four options. The first option is to return to the main program, which will terminate the master control screen. The second option is to print the package history log. If this option is selected, microprocessor 382 will print on manifest printer 90 a log of all packages which have been accepted by the system 310 during the designated time interval. At that point, the system 310 will display a second screen on CRT 322 asking whether the log printed satisfactorily. If an affirmative answer is received, the original four options are displayed on the screen. If the answer is negative, a screen is displayed which instructs the maintenance person to align the paper and to make sure the manifest printer 90 is on line. After a suitable amount of time, the system 310 will reprint the package log on manifest printer 90.

The third option that is presented on the master control screen is to print the credit card log. When this option is selected, the system 310 will print on the manifest printer 90 a log of all credit cards that have been used. After printing, a screen asking whether the log printed satisfactorily will appear on CRT 322. If the answer is affirmative, the original four options will again be displayed. If the answer is negative, instructions regarding the alignment of the paper and on-line status of the manifest printer 90 are again displayed, and the process of printing the credit card log is repeated.

The fourth option available through the master control screen will shut down the program altogether. If this option is selected, the system 310 is rendered inoperative. Servicing may then be performed.

As noted above with respect to the other embodiments, parcels and envelopes in the storage area are picked up regularly by the service delivery persons. Typically, these delivery persons will arrive at approximately the same time every day. Accordingly, in a preferred embodiment, the manifest for the packages in the storage area may automatically print out at the same time every day just prior to the scheduled arrival time of the delivery person. On the other hand, the delivery person may use input device 386 to request a printout of the manifest for all transactions since the last manifest was printed. Preferably, the manifest information is formatted in the proper format for that particular service provider. In addition, a summary report may also be provided to the delivery person. As noted above, such data may be provided to the delivery person's DIAD board in electronic format by providing a suitable output connection. Service personnel input device 386 may also be used to allow the delivery person to verify the package count and to accept or reject a particular package 378 within the storage area.

Figure 19:
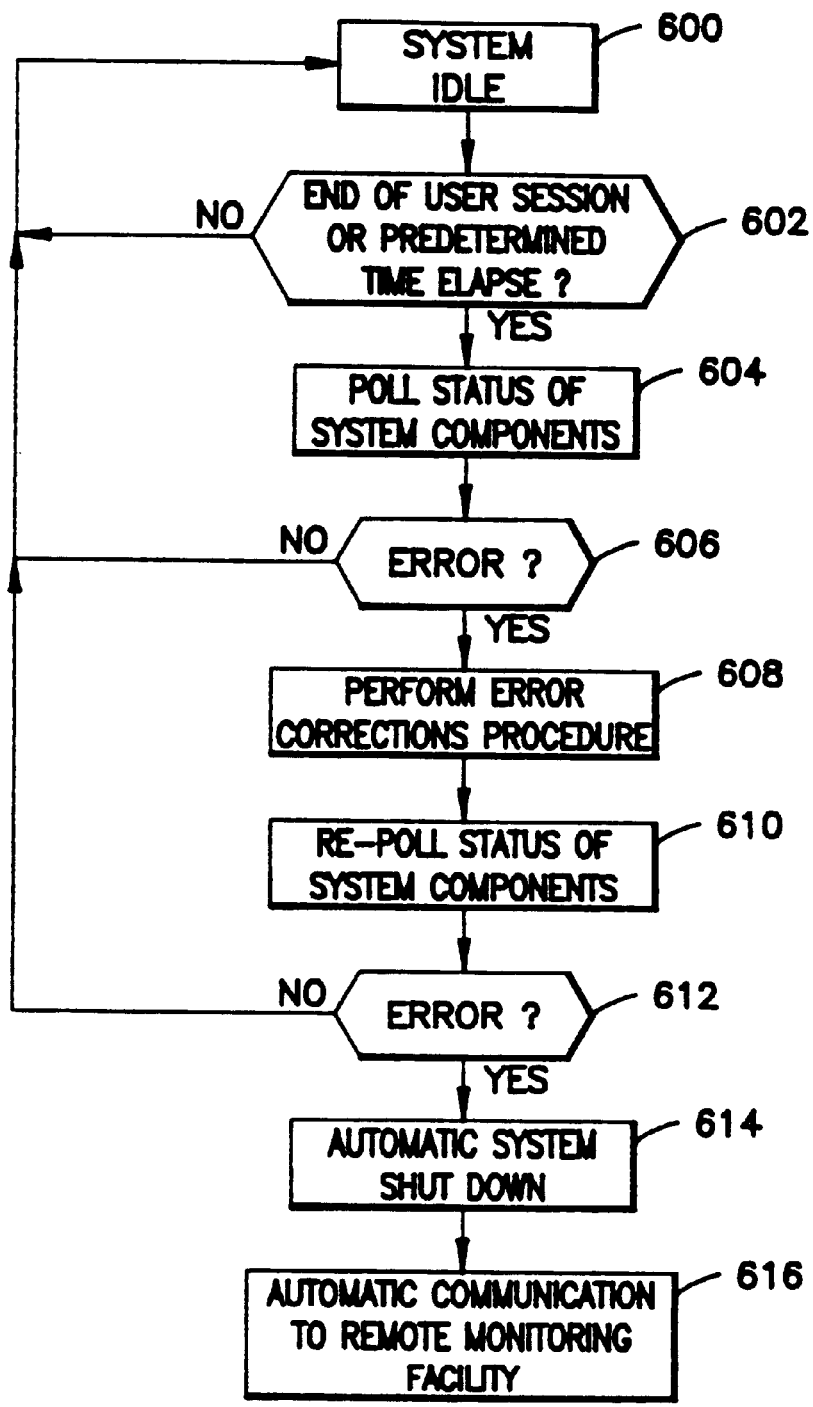
FIG. 19 is a flow chart depicting the diagnostic software of the apparatus illustrated in FIGS. 11–18B.

In accordance with another aspect of the invention, system diagnostics are performed after each transaction and/or every several minutes. Such diagnostics may be performed by having microprocessor 382 actively poll the active elements of the system 310 for status and/or by having the active elements send status interrupts to microprocessor 382. For example, as shown in FIG. 19, after system 310 has been idle at step 600, it is determined at step 602 whether a customer transaction has ended or whether a predetermined amount of time has elapsed. If so, the system components such as those shown in FIG. 17 are polled at 604. If an error is detected at step 606, error correction procedures are performed at step 608. For example, if it is detected that the inner door 336 is jammed, the conveyor belt 340 is activated and an attempt is made to open the inner door 336. On the other hand, a watchdog timer may also be provided which automatically reboots the software if no software pulse is received in a predetermined amount of time. Such a technique prevents software lockup. If the customer transaction has not ended and the predetermined amount of time has not ended at step 602, the system returns to the idle state (step 600). Similarly, if no error is detected at step 606, the system enters the idle state. The system components are then re-polled at step 610 to determine whether the error correction procedures eliminated the error. If so, at step 612 the system 310 is placed back in the idle state. However, if the error was not eliminated, the system 310 is automatically shut down at step 614 and the remote monitoring facility is automatically called at step 616. In a preferred embodiment, the remote monitoring facility is connected to the system 310 via a telephone communications link or some other type of link over which a system file with an error description may be transmitted. In other words, the diagnostic and error data is automatically transmitted to the remote monitoring facility upon detection of an error so that maintenance personnel may be promptly notified to perform maintenance operations on that system 310.

When communicating with the remote monitoring facility, the system 310 may send transaction data and credit card charges for all transactions that occurred during a particular day or other time period. In this manner, the remote monitoring facility may be provided with a history of usage including when customers cancel so that steps may be taken to make the system 310 more user friendly to minimize such customer cancellations. Also, a record of errors may be maintained and package supply orders may be maintained in separate files to facilitate processing. Preferably, such data is encrypted and then decrypted at the home office in order to prevent unauthorized access.

Embodiment of FIG. 20 to FIG. 22(C)

FIG. 20 to FIG. 22(C) illustrate a stand alone automated shipping system 700 constructed in accordance with a fourth embodiment of the invention for generating an appropriate mailing label for application to a parcel, package or envelope for shipment via a commercial carrier.

Figure 20:
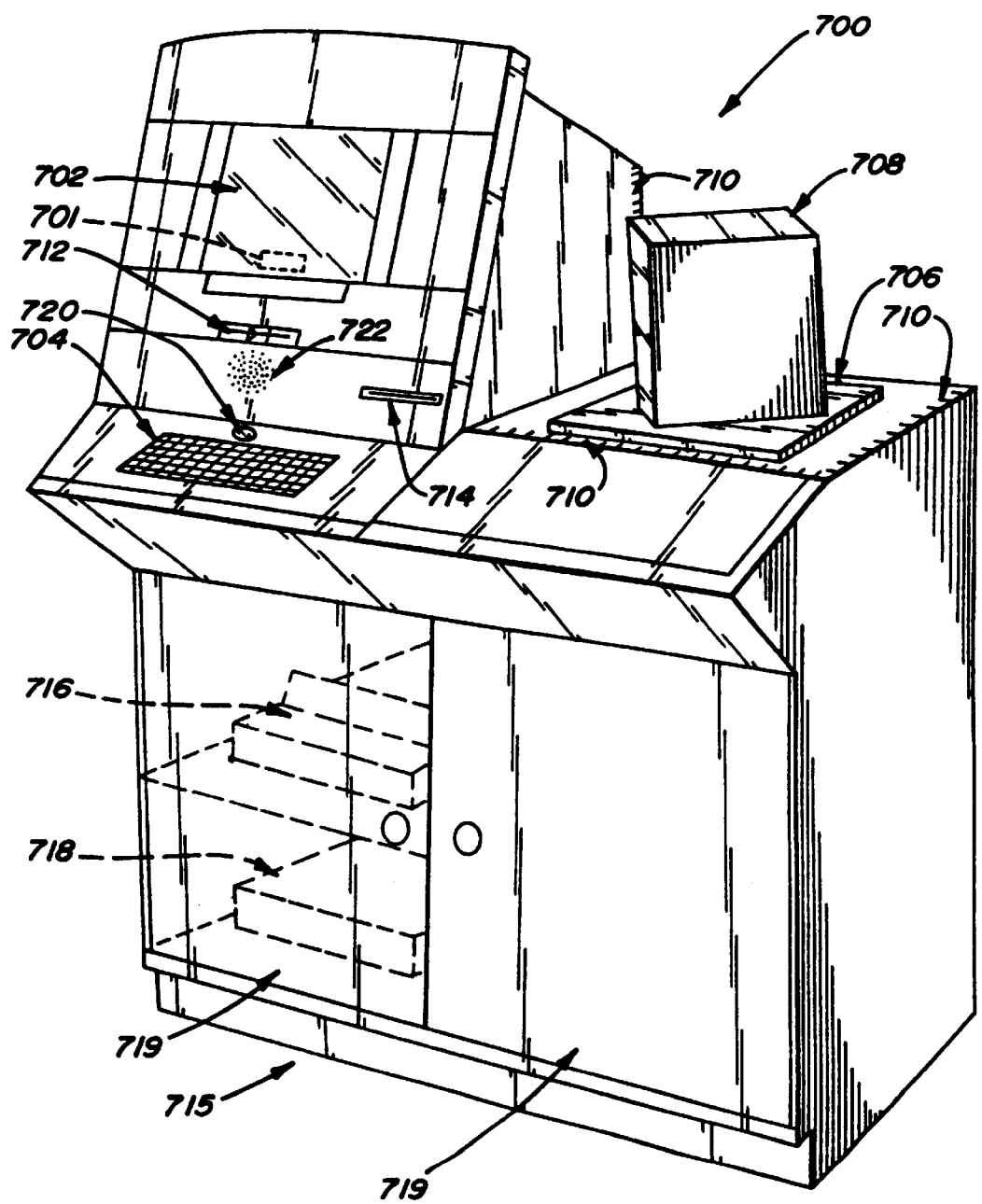
FIG. 20 is a perspective view of an apparatus constructed in accordance with a fourth embodiment of the invention.

The system illustrated in FIG. 20 is designed for maximum efficiency in a high traffic retail environment such as grocery and hardware stores. It is operated by the customer so that retail store employees are not tied up by the complicated paperwork, weighing and calculating charges previously involved in the shipping of small packages. Also, since all data is transferred directly from the customer to the carrier via the system 700, the liability due to error and omissions of the retail employees is greatly reduced.

In this embodiment of the invention, information provided by the customer is used to generate an appropriate mailing label which is then applied to the parcel, package or envelope by the customer. The parcel, package or envelope with the label is then provided to a retail clerk who validates receipt of the package and provides an appropriate receipt to the customer. The retail clerk then places the package in an appropriate location for subsequent pick-up by a commercial carrier.

The embodiment of FIG. 20 to FIG. 22(C) thus differs from the previous embodiments in that it is semi-attended, i.e., a clerk is needed to take the parcel or envelope from the customer, to store the parcel or envelope in a secure storage area, and to validate receipt of the parcel or envelope. This embodiment is otherwise quite similar to the third embodiment.

As illustrated in FIG. 20, the system 700 includes a computer terminal with a CRT 702, a keyboard 704, and a scale 706 for weighing a parcel 708. Preferably, a measuring grid 710 is also provided on the surface including the scale 706 to enable the customer to readily determine the measurements of the parcel 708. A magnetic card reader 712 and a label and receipt printer 714 are also provided as in the previous embodiments. These components all rest on a cabinet 715 which houses the manifest printer 716 and the microprocessor 718. Preferably, access to the manifest printer 716 and microprocessor 718 is limited to service personnel by locking the doors 719 to the cabinet 715. As will be described in more detail below, this embodiment also includes a proximity sensor 720 which senses the presence of a customer and activates a voice file which welcomes the customer to the system using speaker 722.

Generally, prior to using the system 700, the customer prepares a parcel or envelope 708 for shipping. The customer then uses the system 700 of the invention to pay for the shipment with a credit card if a credit card payment option is desired and to generate an appropriate shipping label and receipt. The customer then applies the shipping label to the parcel or envelope 708 to be shipped. The customer then brings the parcel or envelope 708 and receipt to the designated counter for paying the charges for shipment (if cash payment is desired) and deposits the package with the attendant. The attendant then stamps and initials the receipt to validate the shipment and receipt of the parcel or envelope 708 from the customer. The attendant then stores the package in a secure area until the carrier retrieves the package for shipment.

Obviously, this system is substantially simplified from the embodiments described above since the storage and validation process is performed by an attendant. However, the system 700 retains the benefits of the unattended systems described above in that convenience to the customer is greatly enhanced.

Figure 21:
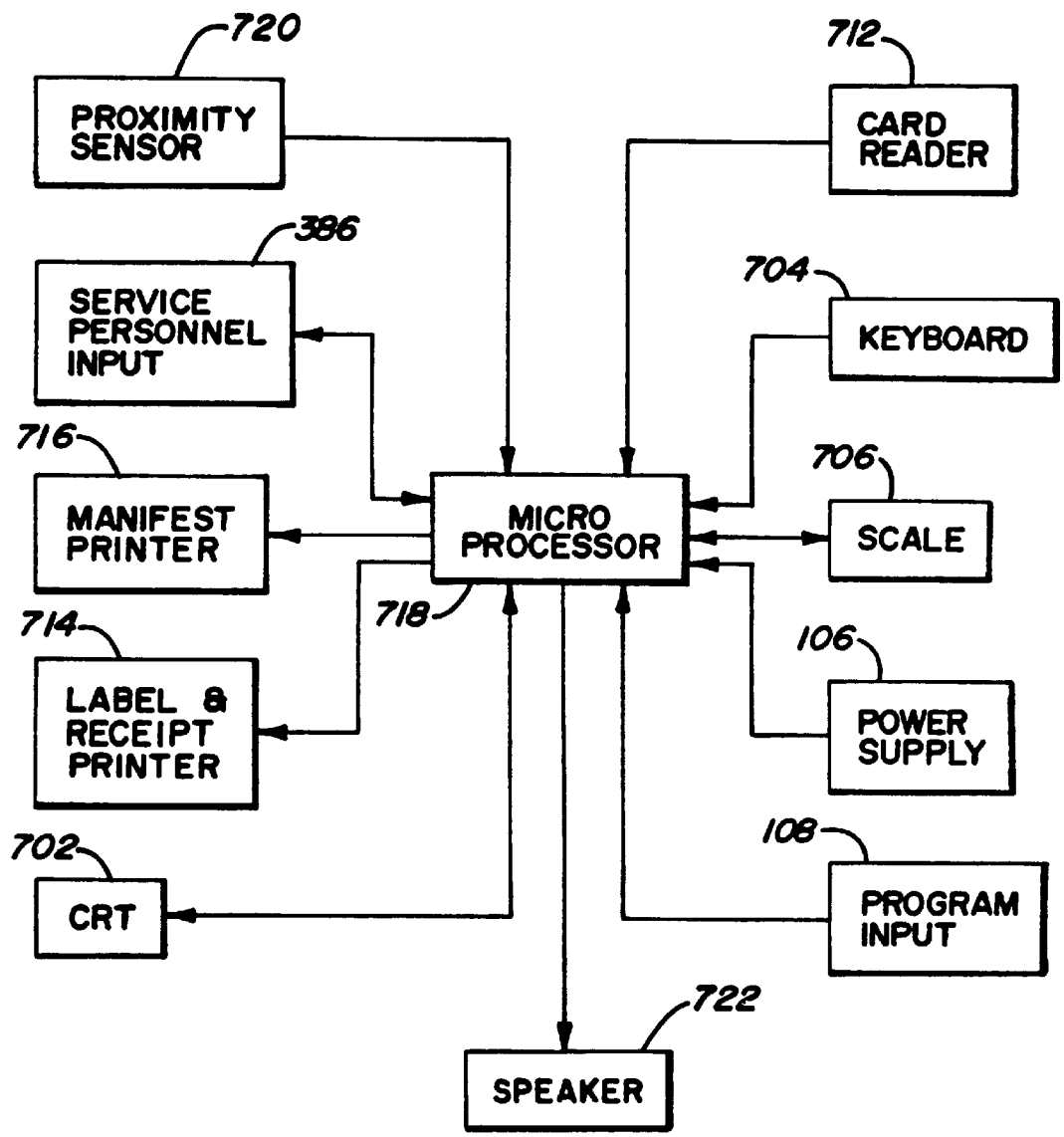
FIG. 21 is a schematic view of a control system for the apparatus illustrated in FIG. 20.

FIG. 21 illustrates a control system for the embodiment of FIG. 20. As in the previous embodiments, the control system illustrated in FIG. 21 coordinates the various sensors and input/output devices of the system. As schematically illustrated in FIG. 21, the control system includes a microprocessor 718 which receives inputs from the various components of the system 700 and provides the appropriate control outputs. Operation of the system 700 is preferably controlled by software implemented by microprocessor 718 as will be described in more detail below with respect to FIGS. 22A–22C.

As in the previous embodiments, inputs to microprocessor 718 include the magnetic card reader 712, the keyboard 704, and the electronic scale 706. Other inputs include a power supply 106 which provides power to the microprocessor 718 and the various electrical components of the system 700 as well as a program input device 108 which is preferably a keyboard provided in the cabinet 715. As with the previous embodiments, program input device 108 allows the software of microprocessor 718 to be accessed for updating by service personnel. Microprocessor 718 preferably contains sufficient memory (ROM and/or RAM) for receiving the data input from the program input device 108.

Other inputs to microprocessor 718 include the touch screen CRT 702 and a service personnel device 386 of the type described above. Preferably, the service personnel input device 386 is also located in the cabinet 715. As in the third embodiment, microprocessor 718 may also provide information to the service personnel upon receipt of certain codes via the input device 386. For example, microprocessor 718 may provide the manifest information directly into the service personnel's DIAD board so that all the shipping information may be taken away in electronic form for further processing.

Outputs from microprocessor 718 include manifest printer 716, label and receipt printer 714, and CRT 702. CRT 702 is used in conjunction with keyboard 704 to provide the necessary input from a customer to microprocessor 718.

In this embodiment, microprocessor 718 also receives an input from a proximity sensor 720 which senses the presence of a customer and activates a voice file within the microprocessor 718 to output information to the customer via a speaker 722.

A description of the software which is operated upon by microprocessor 718 as well as a description of the operation of the fourth embodiment of the invention will now be described in detail with reference to FIGS. 22(A) and 22(B).

As noted above, system 700 is preferably deployed in a retail establishment such a grocery or hardware store. Once the system 700 is in place, the microprocessor 718 is programmed to interface with potential customers by providing the necessary programming input via the program input device 108. As in the third embodiment, the programming software is preferably written in an event driven language such as LABVIEW™ available from National Instruments Corp. Such event driven software provides a graphical data flow which facilitates the design and troubleshooting of the software. Typically, the loaded information includes the appropriate zone and weight charges for all client, delivery services as well as the delivery services available from the licensed commercial delivery service providers. The programmer also loads the corresponding fee files which correspond to each client delivery service available at that location. Once all such information has been loaded in the microprocessor 718, system 700 is ready to interact with potential customers.

Upon approaching the system 700 of the invention, the customer will see graphics and information on CRT 702 describing the services available. Typically, three or four screens scroll every fifteen seconds. When the customer is approximately 24–30 inches away from the CRT 702, proximity sensor 720 senses the customer's presence and activates a voice file for welcoming the customer using speaker 722. The system 700 is now ready for processing a parcel or envelope for shipment. On the other hand, the customer may touch the appropriate portion of the touch screen of CRT 702 to initiate operation of the system 700. Once activated, the software of system 700 guides the customer through the shipping transaction as illustrated in FIGS. 22(A)–22(C).

Figure 22A:
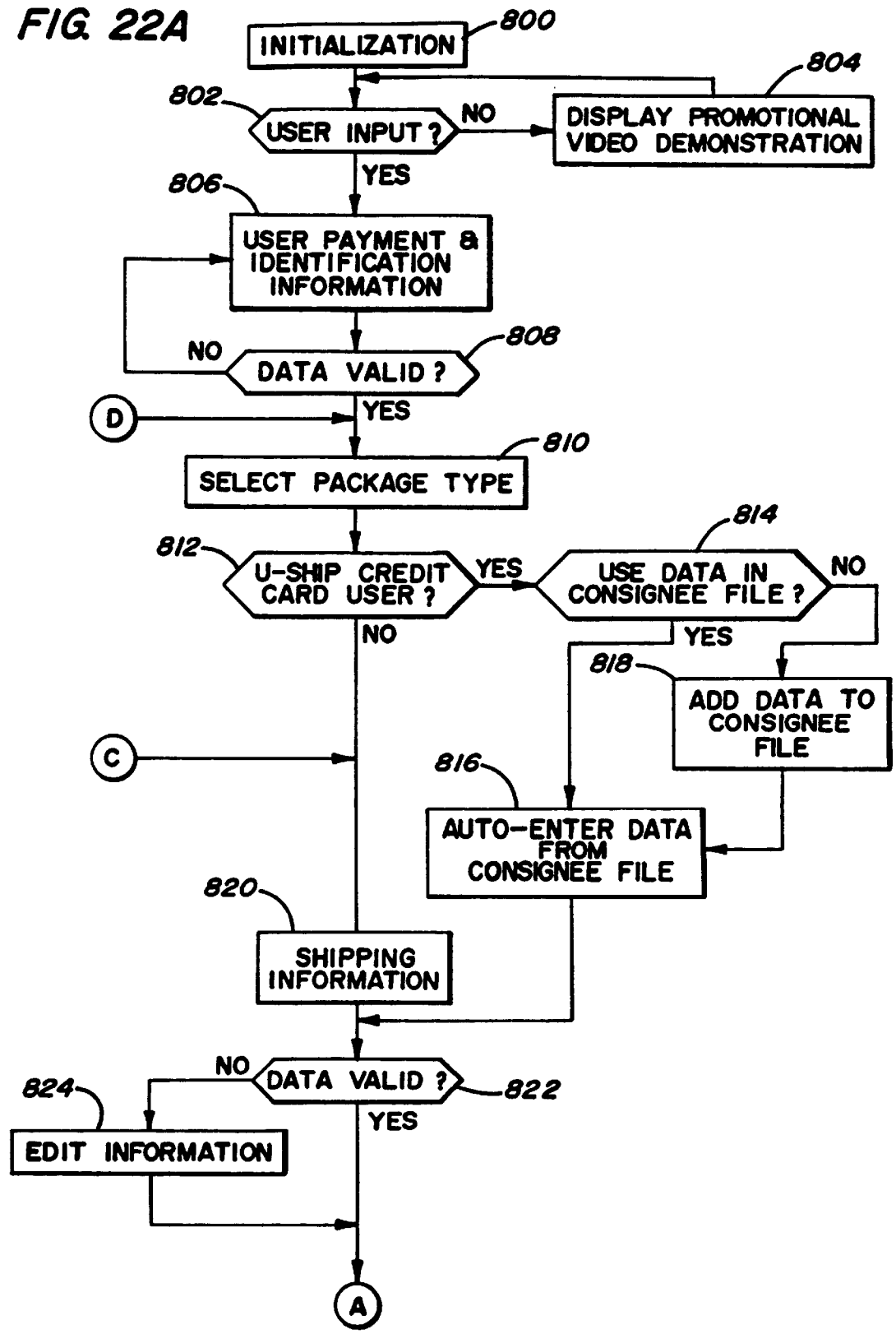
FIGS. 22(A)–22(C) constitute a flow chart depicting operation of the apparatus illustrated in FIGS. 20 and 21.
Figure 22B:
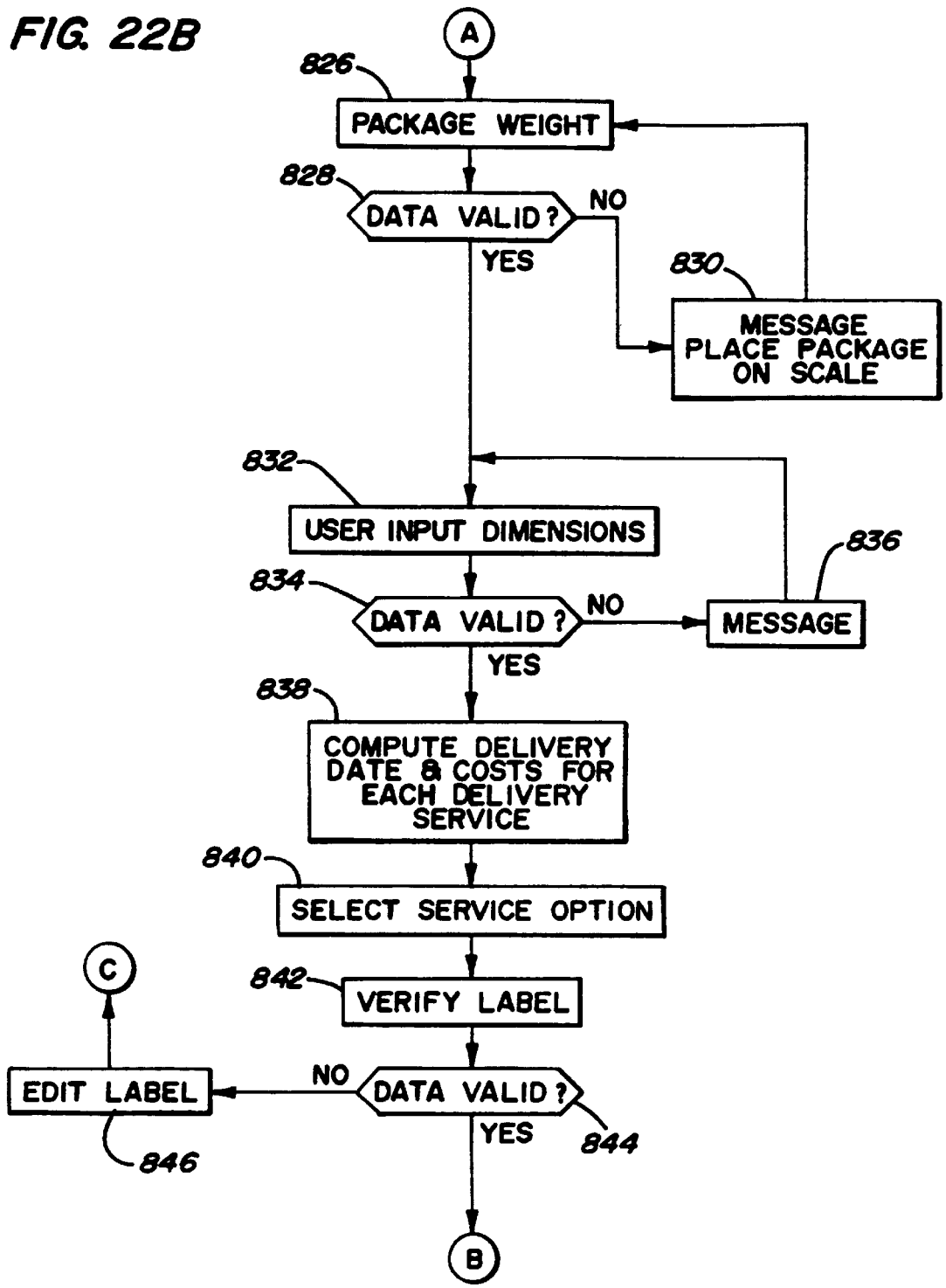
Figure 22C:
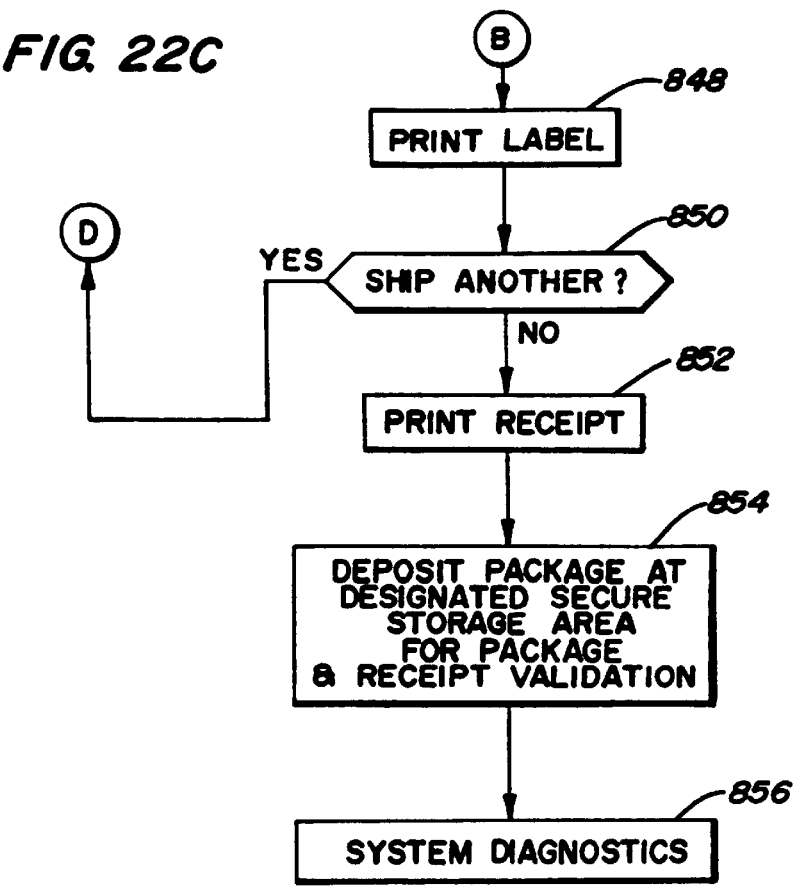

As shown in FIG. 22(A), upon initialization of the system 700 at step 800, the customer is given an option to see and hear a video demonstration illustrating the operation of the system 700. If the customer provides input at step 802 by touching a "demonstration" button 701 (FIG. 20) displayed on CRT 702, or when no input is received from customer, a 7–10 screen demonstration is displayed at step 804 which is accompanied by screen graphics and voice. The customer may cancel the demonstration at any time by touching a "cancel" button on CRT 702.

To begin the shipping process, the customer touches a "start shipping process" button displayed on CRT 702. The customer is then directed to provide the necessary payment and identification information at step 806. Help in operating the system 700 may be obtained at any time by touching a "help" button displayed on CRT 702. As with the previous embodiments, the shipping process also may be cancelled at any time up to the point where the shipment label is verified. The shipping process is cancelled by touching a "quit" button displayed on CRT 702.

Different types of credit or debit cards as well as cash are suitable for payment at step 806. Typically, bank credit cards and vendor issued debit or credit cards are used. At step 808, system 700 checks to see if the card is valid and not recorded in a "bad" card file. However, if cash is selected for payment, this is recorded by the system 700 and is indicated on the label. The cash is then collected by the cashier at the time of depositing the package at the appropriate counter or other designated deposit area. If the payment data is not valid at step 808, the customer is again directed to provide the necessary payment and identification information at step 806.

Once it is determined at step 808 that the payment data is valid, the customer is prompted at step 810 to select the type of parcel to be shipped. As noted above, there are typically two or more type designations such as letter, pak, and package. These designations are determined by the servicing carrier. To select the appropriate package type, the customer simply touches the corresponding button displayed on CRT 702.

System 700 then determines at step 812 whether the customer is using a vendor issued credit card. If so, system 700 will display the name of all recent recipients of packages shipped by that customer using system 700. This information is pulled from a consignee file by microprocessor 718. The customer is then given the option at step 814 to select the name of a recipient to which the customer has previously shipped a package. If the desired recipient is indeed listed in the consignee file, system 700 automatically fills in the "ship to" information in the appropriate places on the mailing label at step 816. However, if the recipient of the package is not currently available in the consignee file, system 700 automatically adds the recipient information to the personal consignee file of that customer at step 818 once the customer has entered the shipping data in the system 700. Preferably, a "personal consignee file" is stored for each customer which includes each recipient to which that customer has shipped a parcel or envelope. The personal consignee file is automatically updated to include the latest recipient and is maintained for future use.

If it is determined at step 812 that the customer did not use a vendor issued credit card, the customer will be prompted to enter shipping information at step 820 using the keyboard 704. As in a previous embodiment, the customer typically provides the zip code and the system 700 then automatically fills in the city and state from its internal geographical file. System 700 then prompts the customer to enter the name, company name (if appropriate) and street address of the recipient of the package. When the company name field has data entered in it, system 700 automatically designates the shipment as a "commercial delivery" shipment as opposed to a "residential delivery" shipment and so indicates on the mailing label. Also, the customer may also be asked to enter the value of the item. If such data is entered, the input value is evaluated and the package automatically insured up to a predetermined maximum. The customer is then given an opportunity at step 822 to check the validity of the data. If editing of the information is necessary, such editing is performed at step 824 before determining the weight of the parcel or envelope at step 826. Of course, the same zip code checks and the like described above may also be used during the input of the shipping information at step 820.

Once all of the shipping information has been properly entered, microprocessor 718 then polls scale 706 at step 826 to determine the weight of the parcel or envelope 708. If no weight or an invalid weight is detected at step 828, system 700 prompts the customer at step 830 to place the parcel or envelope 708 on the scale 706. If no weight is detected for a period of time (usually around 30 seconds), system 700 will assume the customer has left and will abort this shipping transaction.

Once valid packing weight data is obtained, at step 832, system 700 prompts the customer to input the dimensions of the parcel or envelope 708 to be shipped. The customer determines the measurements using measuring grid 710 adjacent scale 706. Screen graphics on CRT 702 help the customer in this process by illustrating how the dimensions of the package are to be measured using the measuring grid 710. System 700 then determines at step 834 whether the input dimension data is valid and issues an appropriate message at step 836 if the dimensions are, for example, too large to be handled at that location. The customer is then given another opportunity to enter the dimensions at step 832 to correct any errors.

After it is determined at step 834 that valid shipping and package information has been entered, system 700 then rates the package by computing the delivery date and cost for each delivery service at step 838. CRT 702 displays all the available shipping options including the pricing and delivery information. The displayed information includes the date of expected delivery, what day of the week that will be, and total shipping costs for each selection. The customer can then select at step 840 which shipping option best suits that customer's needs by comparing the delivery times and costs for that particular parcel or envelope 708.

CRT 702 next displays a shipping label at step 842. The customer is given an opportunity at step 844 to check its accuracy and to edit it as required at step 846. If the zip code is edited at step 846, system 700 goes back and recalculates the shipping charges and gives the customer another opportunity to select the service options at step 840. This is necessary because the shipping charges will probably be different when the shipping address is changed. Also, the customer may be given another chance to select data in the consignee file. Data in the consignee file also will be updated to reflect any address changes. Any other changes may be made without requiring recalculations and system 700 may continue processing the shipment. As in the previous embodiment, tracking information such as bar code labels and the like may also be applied to the label if they are of use to the carrier.

Once it is determined at step 844 that the label data is valid, the label is then printed at step 848. A screen and voice prompt will instruct the customer to apply the label to the parcel or envelope as illustrated on CRT 702. The label preferably has a backing that may be pealed off by the customer so that the label may be readily stuck to the parcel or envelope 708.

At step 850, the customer is given the option to ship another package by touching a "ship another package" button. System 700 will then take the customer back to step 810 to enable the customer to select a package type and declare the package contents, declared value, and the like. The aforementioned steps are then repeated in the same manner as just described. Preferably, all of the previously entered data, such as the address information, will be repopulated onto the label to minimize the amount of customer input. The customer can then simply verify that the information is correct or edit the information if the customer desires to ship the second package to a different address.

Once the customer has processed all packages for shipment, a receipt is printed at step 852 showing the identification number of each package, the city, state and zip code of each package, the charge of each package and the total charges, as well as a tracking bar code (if desired). Additionally, receipt 852 preferably shows a phone number for inquiries relating to the shipment of the parcel or envelope 708 and there is preferably a place in the receipt that must be stamped with a unique vendor stamp which is initialed by the person receiving the package for secure deposit. At step 854, the customer then takes the package and receipt to a counter or designated place of deposit so that the attendant may receive the package, stamp and initial the receipt, and place the package or envelope 708 in a secure storage area until the carrier comes to pick up the packages and envelopes.

One or more times each working day, the carrier will come around and pick up packages and envelopes that are received and stored for shipment in the manner just described. The carriers representative will first go to the system 700 and enter a unique code via keyboard 704 that allows him or her to print the manifest on manifest printer 716. As in the previous embodiment, he or she also may print the manifest, reject a package, or reprint a manifest as required using input device 386. Preferably, the carrier enters a code in a lock on the locked door 719 of cabinet 715, opens the door 719, and retrieves the manifest from the manifest printer 716. Also, as described above, another way to receive the manifest information is to transfer the manifest electronically to a DIAD board or similar device if the carrier is so equipped. After the manifest information is received, the carrier's representative then goes to the counter or designated area and receives the stored packages from the attendant.

At the end of each shipping operation and/or after passage of a predetermined amount of time, system diagnostics are also performed at step 856 in the same manner as described above with respect to FIG. 19. Also, as in the previous embodiment, a master control screen may also be provided for use by maintenance personnel during servicing of the system 700.

Of course, numerous of the other features described with respect to the first, second and third embodiments may also be incorporated into the system of the fourth embodiment, and vice-versa. For example, the consignee file may be used in the first three embodiments and a storage mechanism used in conjunction with the device of the fourth embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed. In addition, while the above description speaks alternatively of mailing parcels, packages, or envelopes, those skilled in the art will appreciate that these terms may be used interchangeably within the scope of the invention as defined by the appended claims.

What is claimed is:

1. A method of mailing parcels and envelopes using an automated shipping machine, comprising the steps of:

receiving payment information from a customer;

receiving package type information including the dimensions of a parcel or envelope to be mailed;

weighing said parcel or envelope to be mailed;

receiving shipping information from said customer including at least a destination of said parcel or envelope to be mailed;

computing from said package type information, shipping information, and weight information, a delivery date and cost for delivery of said parcel or envelope to said destination via at least two delivery service options available to said customer;

receiving an indication of the delivery service option desired by the customer;

printing a tracking bar code label identifying at least said destination;

printing a shipping receipt for an amount including at least the cost of delivering said parcel or envelope to said destination via the delivery service chosen by said customer;

validating receipt of said parcel or envelope as the parcel or envelope for which said tracking bar code label was printed; and storing a validated parcel or envelope in a secure storage area until said parcel or envelope is subsequently picked up for delivery.

2. An automated shipping machine for use in mailing parcels and envelopes, comprising:

means for receiving payment information from a customer;

a scale for weighing a parcel or envelope to be mailed;

a processor which receives package type information including the dimensions of said parcel or envelope to be mailed, shipping information from said customer including at least a destination of said parcel or envelope to be mailed, computes from said package type information, shipping information, and weight information from said scale, a delivery date and cost for delivery of said parcel or envelope to said destination via at least two delivery service options available to said customer, and receives an indication of the delivery service option desired by the customer;

a printer responsive to said processor so as to print a tracking bar code label identifying at least said destination and to print a shipping receipt for an amount including at least the cost of delivering said parcel or envelope to said destination via the delivery service chosen by said customer; and means for validating receipt of said parcel or envelope as the parcel or envelope for which said shipping label was printed by said printer, whereby a validated parcel or envelope is stored in a secure storage area until said parcel or envelope is subsequently picked up for delivery.

* * * * *